(12) United States Patent
Futterer

(10) Patent No.: US 10,394,189 B2
(45) Date of Patent: Aug. 27, 2019

(54) DISPLAY DEVICE FOR HOLOGRAPHIC RECONSTRUCTION

(71) Applicant: SEEREAL TECHNOLOGIES S.A., Munsbach (LU)

(72) Inventor: Gerald Futterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 15/109,421

(22) PCT Filed: Jan. 5, 2015

(86) PCT No.: PCT/EP2015/050050
§ 371 (c)(1),
(2) Date: Jun. 30, 2016

(87) PCT Pub. No.: WO2015/104239
PCT Pub. Date: Jul. 16, 2015

(65) Prior Publication Data
US 2016/0327906 A1 Nov. 10, 2016

(30) Foreign Application Priority Data
Jan. 7, 2014 (EP) .................................. 14150286

(51) Int. Cl.
*G03H 1/22* (2006.01)
*G02F 1/1335* (2006.01)
(Continued)

(52) U.S. Cl.
CPC ........... *G03H 1/2294* (2013.01); *G02B 26/06* (2013.01); *G02F 1/133553* (2013.01);
(Continued)

(58) Field of Classification Search
CPC ...... G03H 1/2294; G03H 1/02; G03H 1/2286; G03H 1/2205; G03H 2223/20;
(Continued)

(56) References Cited

U.S. PATENT DOCUMENTS 9,291,828 B2 3/2016 Kroll et al.
2010/0046049 A1 2/2010 Kroll et al.
(Continued)

FOREIGN PATENT DOCUMENTS

WO 2012/085045 A1 6/2012

OTHER PUBLICATIONS

International Search Report, dated Aug. 10, 2015, and Written Opinion issued in priority International Application No. PCT/EP2015/050050.
(Continued)

*Primary Examiner* — Wen Huang
(74) *Attorney, Agent, or Firm* — Saul Ewing Arnstein & Lehr LLP

(57) ABSTRACT

The invention relates to a display device for holographic reconstruction. The display device comprises a spatial light modulator device having combined phase modulating pixels and amplitude modulating pixels, an illumination unit generating sufficiently coherent light and arranged to illuminate of the spatial light modulator device and a reflection plane. The device being arranged such that light enters the spatial light modulator device and passes both the phase modulating pixel and the amplitude modulating pixel of the spatial light modulator device. The light is reflected by the reflection plane in between.

34 Claims, 14 Drawing Sheets

(51) Int. Cl.
*G02B 26/06* (2006.01)
*G03H 1/02* (2006.01)
*G02B 26/08* (2006.01)
*G03H 1/08* (2006.01)

(52) U.S. Cl.
CPC .............. *G03H 1/02* (2013.01); *G03H 1/2286* (2013.01); *G02B 26/0833* (2013.01); *G02F 2001/133538* (2013.01); *G02F 2001/133616* (2013.01); *G02F 2203/50* (2013.01); *G03H 1/2205* (2013.01); *G03H 2001/0224* (2013.01); *G03H 2001/0858* (2013.01); *G03H 2222/18* (2013.01); *G03H 2222/35* (2013.01); *G03H 2223/16* (2013.01); *G03H 2223/19* (2013.01); *G03H 2223/20* (2013.01); *G03H 2223/22* (2013.01); *G03H 2223/24* (2013.01); *G03H 2225/22* (2013.01); *G03H 2225/24* (2013.01); *G03H 2225/33* (2013.01); *G03H 2225/34* (2013.01); *G03H 2225/36* (2013.01); *G03H 2225/55* (2013.01)

(58) Field of Classification Search
CPC ... G03H 2001/0224; G03H 2001/0858; G03H 2222/18; G03H 2222/35; G03H 2223/16; G03H 2223/19; G03H 2223/22; G03H 2223/24; G03H 2225/22; G03H 2225/33; G03H 2225/34; G03H 2225/36; G03H 2225/55; G02B 26/06; G02B 26/0833; G02F 1/133553; G02F 2001/133538; G02F 2001/133616; G02F 2203/50
USPC .......................................................... 359/32
See application file for complete search history.

(56) References Cited

U.S. PATENT DOCUMENTS

2010/0265558 A1  10/2010  Leister et al.
2011/0096381 A1   4/2011  Leister et al.
2012/0092750 A1   4/2012  Kroll et al.

OTHER PUBLICATIONS

Birch et al., "Fully complex optical modulation with an analogue ferroelectric liquid crystal spatial light modulator." Optics Communications, vol. 175, No. 4-6, pp. 347-352 (Mar. 1, 2000) XP004202913.

DISPLAY DEVICE FOR HOLOGRAPHIC RECONSTRUCTION

CROSS-REFERENCE TO RELATED APPLICATIONS

This application claims the priority of PCT/EP2015/050050, filed on Jan. 5, 2015, which claims priority to EP Application No. 14150286.4, filed on Jan. 7, 2014, the entire contents of each of which are incorporated fully herein by reference.

BACKGROUND OF THE INVENTION

The present invention relates to a display device for holographic reconstruction. In particular the present invention relates to a display device using in particular a planar combination of adjacent modulating pixels of a spatial light modulator device. Such display devices are required mostly for mobile applications like smart phones and tablet computers. However, other applications are also possible Furthermore, the present invention relates also to a method of generating a holographic reconstruction and a spatial light modulator device applied in such a display device for generating at least one of a two-dimensional and/or three-dimensional representation of a scene or of content.

The present display device is adapted for displaying two-dimensional (2D) and/or three-dimensional (3D) images. It shall be understood that two-dimensional images or three-dimensional images also include two-dimensional or three-dimensional contents or movies. The field of application of the present invention includes preferably direct-view display devices for the three-dimensional presentation of holographic images.

In a commercially available flat TV display for the presentation of two-dimensional images or movies/videos, it is necessary to realize a bright and homogeneous illumination of the entire surface at high resolution. The spatial light modulator device which serves as display panel is required to emit the light in a large angular range. The information to be presented is written into the spatial light modulator device of the display device. The light which is emitted by an illumination unit comprising a light source unit is modulated with the information that is written into the spatial light modulator device, where the spatial light modulator device often at the same time serves as screen or display panel. It is therefore necessary to strictly ensure parallel incidence of the light beams onto the spatial light modulator device and to achieve a high refresh rate of the spatial light modulator device. To achieve a high quality of the three-dimensional presentation of the information written into the spatial light modulator device, a defined collimation of the wave fronts that are coupled out of the illumination unit is necessary in addition to a homogeneous illumination of the entire surface of the spatial light modulator device. This is of high importance for holographic presentations in the form of a reconstruction that is to be generated. The holographic information, which can for example be an object that is composed of object points of a three-dimensional scene, is encoded in the form of amplitude and phase values in the pixels of the spatial light modulator device. The encoded object points are generated by the wave field that is emitted by the spatial light modulator device.

A complex value which serves to modulate both the phase and the amplitude of a wave front cannot be displayed satisfactorily directly in a single pixel of a conventional spatial light modulator device. The modulation of only one value per pixel, i.e. a phase-only or an amplitude-only modulation, however only results in an insufficient holographic reconstruction of a preferably moving three-dimensional scene. A direct and thus optimal—in the sense of generalized parameters—representation of the complex values can only be achieved by a complex-valued modulation preferably at the same plane and at the same time in the spatial light modulator device.

Depending on the actual type of spatial light modulator device, various methods are known to achieve a simultaneous modulation of both parts of the complex values to be displayed.

For example, two separately controllable spatial light modulators can be combined and arranged very close to each other in order to simultaneously modulate both the amplitude and phase of coherent light. One spatial light modulator modulates the amplitude; the other one modulates the phase of the incident light. Further combinations of modulation characteristics are also possible with such an arrangement.

The light must first pass through one pixel of the first spatial light modulator and then through the corresponding pixel of the second spatial light modulator. This can be achieved for example in that the first spatial light modulator is imaged onto the second spatial light modulator by a large-area optical element, e.g. a lens, or the first spatial light modulator is imaged onto the second spatial light modulator by an array of small-sized lenses, or the two spatial light modulators are sandwiched together.

These combinations of two spatial light modulators which serve to achieve a complex-valued modulation have the disadvantage that the distance between the two spatial light modulators is much larger than their pixel pitch, i.e. the distance between two pixels.

A typical pixel pitch of a spatial light modulator for holographic applications is e.g. between 10 µm and 50 µm. In contrast, the distance between the two spatial light modulator panels in a sandwich arrangement is several 100 µm, in arrangements where one spatial light modulator panel is imaged onto the other, their distance is even larger.

Many types of spatial light modulators, such as liquid crystal (LC) spatial light modulators typically have an addressable layer of liquid crystals which is embedded between transparent glass substrates. Alternatively, in a reflective display device, the addressable layer is disposed between a transparent glass substrate and a reflective glass substrate. The glass substrates typically have a thickness of e.g. between 500 µm and 700 µm.

A sandwich structure for a complex-valued modulation can be created in that a single phase-modulating spatial light modulator and a single amplitude-modulating spatial light modulator are arranged with their glass substrates one after another. When a pencil of rays coming from the addressable layer of a pixel of the phase-modulating spatial light modulator falls on the addressable layer of a pixel of the amplitude-modulating spatial light modulator after the passage through the glass substrates, it would already be broadened at the aperture of this pixel by diffraction effects so that cross-talking of pencils of rays of adjacent pixels would occur.

When using imaging elements, there is the challenge that exactly one pixel of the first spatial light modulator must be imaged onto one pixel of the second spatial light modulator across the entire surface of the spatial light modulators. This requires optical systems which exhibit extremely little distortion. Such requirements can hardly be fulfilled in practice.

This is why cross-talking between adjacent pixels also takes place when an imaging technique is employed.

Cross-talking can be even worse if the two spatial light modulator panels, the optical imaging system or the light sources are not perfectly aligned in relation to each other.

Furthermore, if spatial light modulator panels are combined and disposed very close to each other, such arrangements are susceptible to errors when diffraction of the incident wave field will take place at the first plane of diffracting apertures, which is e.g. a phase spatial light modulator forming the first plane of the sandwich-type complex spatial light modulator. The diffracted light from a pixel placed in the first spatial light modulator panel, can propagate to adjacent, non-corresponding pixels of the second spatial light modulator panel. In other words, e.g. 80% of the light propagating behind a phase modulating pixel of the first panel can illuminate the related amplitude modulating pixel of the second panel. Other 10% cannot hit a transparent part of the amplitude panel which means that this 10% can be blocked by the absorbing parts of the apertures. And the remaining 10% can illuminate adjacent amplitude pixels which means to generate crosstalk within the sandwich. This crosstalking deteriorates e.g. the reconstruction quality of a holographic display device because this corresponds with a wrong combination of amplitude and phase values when complex values are represented by the spatial light modulators.

As a consequence, the distance between phase and amplitude modulating planes has to be preferable less than ten times the smallest pixel pitch, which is present along a coherent direction. For instance, in the case of using one-dimensional encoded sub-holograms, which can be the case for holographic TV, the light illuminating the spatial light modulator is coherent along one direction only, which can be e.g. the vertical direction.

In display devices used for holographic reconstruction a complex modulation of sufficiently coherent light emitted by the illumination unit has to be achieved to control the amplitude and the phase of pixels of a spatial light modulator device, herein after referred to as SLM, independently from each other. The use of a respective spatial light modulator device is therefore necessary.

A possibility to obtain the complex modulation by an SLM is to laterally combine adjacent phase modulating pixels and amplitude modulating pixels.

Such a lateral arrangement of adjacent amplitude modulating pixels and phase modulating pixels is disclosed in WO 2009/080576 A1. This document describes a controllable light modulator comprising a number of macro-pixels of at least two pixels which are arranged next to each other, where retro-reflective elements are provided. A retro-reflective element has two reflective surfaces, which are in parallel in the vertical direction. The reflective surfaces are arranged without gap under a given angle of 90° deg such that they form a prism with a substrate layer in which the retro-reflective element is arranged and such that they reflect an incident part of a wave field.

In general, a pixel combining arrangement in an SLM can make use of tilted surfaces, which can be realized e.g. as one-dimensional (1D) or two-dimensional (2D) prism structures, which can be realized by using e.g. molding or imprint technologies.

The precision of the prism angles, which can be realized, is significantly less than $1/10°$ deg. And even an angular tolerance of 0.5° deg requires significant technical effort if realized at a display size area and with a prism spacing of <100 μm.

It is not sufficient to focus onto the combination of a phase modulating pixel and an amplitude modulating pixel, which are placed sequentially along the optical path of the illuminating light, regardless if a standard-type display sandwich is used or adjacent phase modulating pixels and amplitude modulating pixels are combined in order to form a functionally sequential phase and amplitude-SLM sandwich. This is only one boundary condition. To understand the requirements the entire function has to be understood, which is the generation of real or imaginary object points within the space of a frustum, which is spanned by a viewing window (VW) where a user's eye is placed and the SLM and even might continue behind the SLM, and which has a pyramid-like structure. The generation of the object points requires a collimated illumination. To show high definition content means to limit the angular spectrum of plane waves (ASPW) of the illumination to $1/60°$ deg.

Furthermore, there is a difference between the angular spectrum of plane waves and the angular distribution, which is added by the micro prism array e.g. used in WO 2009/080576 A1. The angular spectrum of plane waves has to be $\leq 1/60°$ deg but the angular variation, which is added by the prisms, has not to be as small as this value of the angular spectrum of plane waves and can be e.g. >0.5° deg. An individual calibration of local pixels of the SLM is not required if it is as small as $1/60°$ deg. But if the angular variation, which is introduced by the prisms, significantly exceeds $1/60°$ deg, then a local calibration is required in order to provide the exact phase values within the entrance plane of the human eye, which means the design values of the complex-valued wave field. In other words, a calibration of all pixels or at least of a very high number of sampling points has to be carried out. The plane of the measurement can be the display plane or close to the display device. The locally measured wave field, which means locally measured phase and amplitude distributions, can be propagated to a viewing window by using e.g. a Fresnel transformation. In other words, this can be done by using calculations of phase and amplitude distributions. However, the complex-valued wave field which is emitted by individual pixels or rather complex-valued pixels of the SLM can also be measured within the viewing window itself without using calculated propagation. The viewing window is a visibility region in a user plane. If the position of the viewing window in the user plane coincides with the eye of a user and then the user looks through the viewing window, he can observe the reconstructed scene.

SUMMARY OF THE INVENTION

Therefore, it is an object of the present invention to provide a display device which avoids the disadvantages of prior art display devices. Furthermore, the display device shall be designed adequately flat where a complex modulation of sufficiently coherent light has to be achieved to control the phase and the amplitude independently from each other in a spatial light modulator device.

It is a further object of the invention to design the display device with a construction which shall be simple and cost-efficient.

Furthermore it is an object of the invention to develop a method by which a complex-valued modulation of light can be achieved in a simple way.

For this reason, according to the invention the object is achieved by way of a display device claimed in claim 1.

The display device according to the invention is provided for holographic reconstruction of a scene, preferably for displaying two-dimensional and/or three-dimensional images. The display device comprises a spatial light modulator device having combined phase modulating pixels and amplitude modulating pixels. An illumination unit capable of illumination of the spatial light modulator device is further provided. The display device further comprises a reflection plane. All these components are arranged for generating sufficiently coherent light which is required for a holographic reconstruction and which is emitted by the illumination unit. This light enters the spatial light modulator device and passes then both the phase modulating pixel and the amplitude modulating pixel where the light is reflected by the reflection plane in between.

In this way, combined phase modulating and amplitude modulating pixels of a display panel are provided in order to realize a complex valued display device. In other words, it is provided to combine phase modulating (shifting) pixels and amplitude modulating pixels which are close to each other. The spatial light modulator device comprises an addressable transmissive layer for forming the pixels. This addressable transmissive layer can be a liquid crystal layer. However also other discrete realizations of the spatial light modulators are possible, e.g. electrowetting-based spatial light modulators or magneto-photonic crystal-based spatial light modulators. Usually the liquid crystal thickness of such an addressable transmissive layer, which is required for $2\pi$ phase modulation of phase modulating pixels, is twice as high as the liquid crystal thickness, which is required for ON to OFF modulation of amplitude modulating pixels. In the present invention however, the liquid crystal thickness of the amplitude modulating pixel can be equivalent to the one of the phase modulating (shifting) pixel. This can be preferably realized by implementing a double path arrangement for the phase modulating pixels. The redirection of the light, which passes the first pixels, the phase modulating pixels or the amplitude modulating pixels, is introduced by using the reflection plane, which is placed at one side of the spatial light modulator device.

Thus, a display device for holographic reconstruction of a scene is developed which is flat in its construction and achieves a complex modulation of light.

A display device with these basic components can be supplemented with further optical components, or the existing components can be arranged in a different way such that, for instance, either a transmissive or a reflective spatial light modulator device is created. Spatial light modulator device is herein after referred to as SLM.

Further preferred embodiments and improvements of the present invention are defined in the dependent claims.

In a first preferred embodiment of the invention, the display device can be designed such that the phase modulating pixels and the amplitude modulating pixels of the spatial light modulator device are laterally combined within the same plane. To place the phase modulating pixels and the amplitude modulating pixels laterally combined and arranged in the same plane of the spatial light modulator device has the advantage to be able to use a constant thickness of the addressable transmissive layer and to pass the phase modulating pixels or the amplitude modulating pixels, depending on the used layout, two times.

Advantageously, an oblique illumination of the spatial light modulator device can be provided. In other words, it is preferred to use slanted illumination of the SLM plane. An illumination of the SLM of, for instance, 5° deg to 25° deg can be used. This angular range can be practical for a plurality of liquid crystal modes. Some liquid crystal modes can be illuminated e.g. at 45° deg. Slanted illumination can be provided by several types of illumination units. However, volume grating-based illumination units can be preferred. This is due to the angular and spectral selectivity of Bragg diffraction-based volume gratings.

The illumination unit can be designed as front light illumination unit or backlight illumination unit.

The illumination to be used within a holographic display device should provide the longitudinal and mutual coherence required. The approach of using sub-holograms for the displaying of object points seen by a user requires reduced mutual coherence. To use the minimum coherence required means to use a small area of spatial coherence, which on the other hand means a large size of a light source provided in the illumination unit, which is equivalent to a wider angular spectrum of plane waves of the light source.

Using speckle superposition in order to reduce the recognizable speckle pattern, still within the $\frac{1}{60}$° deg range, is a further option. High speed phase change will result in a change of the speckle pattern, which means that the eye of a user will see a mean value of hundreds of speckle pattern, which gives a smoothing.

In the case of using diffractive elements in the illumination unit the change of the angular spectrum of plane waves has to be taken into account. The angular spectrum of plane waves of light illuminating a grating is—due to the gratings diffraction equation—changed in dependence on the diffraction angle and can be treated as unchanged for small angles only. For instance, if one realizes a geometry of reconstruction of −84.26° deg to 0° deg meaning 84.26° deg diffraction angle in the case of realizing this e.g. within a medium having a refractive index of e.g. n=1.5, than one obtain a beam stretching factor of 10, which enables a reasonable thin collimated backlight illumination unit. Alternatively, one can illuminate a PMMA (polymethylmethacrylate) plate comprising a tailored anti-reflection layer at the light entrance side at 84.26° deg. Within the PMMA plate the light propagates along 41.55° deg.

At the light exit side a volume grating can be provided, which has a geometry of reconstruction of −41.55° deg to 0° deg. The exit plane of the backlight illumination unit can be glued onto the entrance plane of the spatial light modulator device (SLM). The arrangement which works at 84.26° deg on air also provides a beam stretching factor of 10. A beam stretching factor of 20 can be obtained if working at 87.13° deg instead of 84.26° deg. The beam stretching factor is inversely proportional to the squeezing factor of the angular spectrum of plane waves. Thus, an anamorphic beam stretching of a factor of 10 results in a multiplication of the angular spectrum of plane waves with a factor of $\frac{1}{10}$. On the other hand, a small diffraction angle of 25° deg will change the angular spectrum of plane waves by 10% only. In other words, small diffraction angles do not significantly change the angular spectrum of plane waves.

A point source is not required. M>1 can be acceptable as long as the angular spectrum of plane waves is within the required range, where M is the magnification. This means that an extended light source is preferred. And this is the reason why dynamic scatter or beam shaping elements in general can be mounted e.g. on piezo ceramic (PZT) or voice coil elements. To use rotating scatter plates, which are e.g. mounted on a rotating electric motor had always been implemented in the concepts of the illumination units. The angular spectrum of plane waves of the spatial light modulator has to be illuminated with is $\leq \frac{1}{60}$° deg.

The angular spectrum of plane waves which can be used within a wedge-type-based backlight illumination unit based on 10× beam stretching is ten times the angular spectrum of plane waves, which is required for the illumination of the SLM. This value of $1/6°$ deg is a realistic one, because of the fact that the angular spectrum of plane waves will be reduced by a factor of 10 if using a 10× magnification within the wedge type backlight illumination unit. For example, an angular spectrum of plane waves which is $1/6°$ deg along the diffraction plane and which is present in front of a 10 times anamorphic beam stretching-based wedge backlight illumination unit will be reduced to $1/60°$ deg behind this backlight illumination unit.

Due to the grating equation, which can be used to describe the angular spectrum of plane waves, aspect of a diffractive wedge type-based backlight illumination unit, a slight non-symmetric demagnification of the angular spectrum of plane waves is obtained. For instance an entrance angle of the light onto a grating plane of the wedge type backlight illumination unit of $-(84.2608+-0.7)°$ deg results in an exit angle of the light which is diffracted around the 0° deg direction in order to illuminate the SLM, of $(0+0.0743-0.0657)°$ deg, which means that the squeezing of the angular spectrum of plane waves, which is due to the 10× beam stretching, is slightly non-symmetric but approximately $1/10$. For angles, which are slightly larger than 84.2608° deg the beam stretching factor is slightly larger than 10, and for angles, which are slightly smaller than 84.2608° deg, the beam stretching factor is slightly smaller than 10, which results in a slightly non-symmetric squeezing or demagnification factor of the angular spectrum of plane waves, which is approximately $1/10$.

Furthermore, the use of scatter elements and a variable phase changing electronically addressable array type element which are e.g. MEMS (micro electro mechanical systems) and mirror array-based can also be provided in order to tailor the mutual coherence of the illumination unit.

For example, an element that provides the fast statistical randomized change of the phase values which are present within the area of an extended light source has to be adapted on the frame rate (frames per second, fps) required. For example, four user RGB (red, green, blue or red, yellow, blue) left and right eye at 60 Hz fps give 24×60 Hz=1440 Hz, which has to be provided by a tracking unit which is e.g. an in-plane rotating liquid crystal-based actively controlled grating. An RGB time-sequential SLM has to work at 1440 Hz/4=360 Hz. The time window which can be used for "light source ON" is slightly smaller than $1/1440$ s, which means e.g. $1/1600$ second only. In general, laser diodes as light sources can be modulated that fast. However, if lasers as light sources which cannot be modulated that fast are used than fast shutters can be used. These elements can be, e.g., based on liquid crystals (LC), LC-dispersed volume gratings, acoustic optical modulators (AOM), saturation-dependent absorptive filters, on PZT or even on MEMS technology. For instance, PZT elements, which can be found in standard tweeters realize frequencies of 24 kHz which also can be obtained by using voice coil actuators. Only sub-100 µm-movement can be required in order to provide sufficient randomization of the light sources phase distribution. Discrete values are dependent on the discrete embodiments.

The end of a multi-mode fibre can be just placed in front of a dynamic scatter plane, seen in the propagation of light. It is also practical for providing a colour representation to image the three ends of three optical multi-mode fibres onto the dynamic scatter plane. This gives the opportunity to implement slight shifts between the red, green and blue light source, which results in slightly different exit angles which are present behind a collimating (achromatic) unit, seen in the propagation of light, and which can be used for RGB-independent alignment. Thus, e.g., the overall diffraction efficiency of a backlight illumination unit can be optimized. Known colour-combining prism arrangements, as e.g. used for three CMOS chip camcorders or a set of dichroitic filters, can be used in front of the collimation unit (seen in propagation of light), which can be e.g. an achromatic lens which is combined with a beam-shaping element increasing the overall light efficiency by providing e.g. a so-called flat top intensity distribution. So-called X-cube colour-combining prism elements do not provide a constant phase value within the area of reasonable constant intensity which illuminates e.g. the collimation unit (achromatic lens). But so-called Philips-prism type colour-combining prisms do this. Thus in the exit plane of the collimation unit (achromatic or even apochromatic lens), a non-ideal phase distribution can be present, which depends on the optical components used. Several options such as encoding, calibrating or calibrating with a Look-up Table can be used to compensate for unwanted phase distributions, which would decrease the image quality of holographic three-dimensional objects.

Important is here that, instead of using a point light source or e.g. mono-mode fibres, an increased beam diameter meaning a laterally extended light source can be used. An angular range of $1/60°$ deg=$±1/120°$ deg can be used to illuminate the SLM of the display device. The maximum angular resolution of the human eye of a user is $1/60°$ deg. This means that in the case of using two-dimensional encoding and a holographic three-dimensional display device placed at a distance $d_{du}$ in front of the user the user will not recognize a smearing of three-dimensional object points as long they are not placed closer to the user than $d_{du}/2$ (assuming an optimal encoding and display performance). Due to the fact that the frustum is a pyramid-like structure which goes from infinity through the edges of the display device to the user's entrance pupil the three-dimensional volume which is occupied within $d_{du}/2$ to the eye is very small either and not that interesting for the three-dimensional content. That is why it could be no problem to limit the three-dimensional volume from infinity to $d_{du}/2$. To reconstruct object points closer to the user requires a reduced ASPW.

In cases of significant scatter effects which can be introduced by non-perfect display components the angular range of the illumination can be reduced. This applies only for small disturbing scatter angles. This means that e.g. an angular spectrum of plane waves of $1/100°$ deg can be practical, too.

Several front light illumination units can be used in order to illuminate complex-valued reflective type SLMs.

Wedge type-based front light illumination units can be used for mid-size displays (≥20 inch) and large size displays (≥60 inch). Grazing incidence-based front light illumination units, zigzag beam-based front light illumination units and wave guiding-based front light illumination units can be used for smaller display sizes. The angular selectivity of a used volume grating in the illumination unit provides the separation of the illumination and the imaging beam path. For example, an illumination of the volume grating at 10° deg results in a propagation angle of the light, which goes to the user space, of −10° deg. This means that 20° deg angular separation is present. This is sufficient in order to separate the beam path incident on the SLM and after modulation in the SLM returning back to the illumination unit comprising the volume grating.

Also structured illumination can be used in order to save optical power and/or in order to eliminate patterned polarisation filters or a retardation plane in the display device. This requires additional technical effort and precise alignment. Here, structured illumination shall mean e.g. a strip-shaped illumination.

It can also be possible to use global illumination, meaning homogeneous illumination, and patterned blocking, which is introduced behind the front light illumination unit, seen in the propagation of light, and which e.g. is implemented by using a simple amplitude mask. But this requires a very thin front light illumination unit and reasonable large pixels, which means e.g. a 200 µm thick front light illumination unit and >50 µm pixel pitch.

Backlight illumination units can be used preferably for complex valued transmissive type SLMs. In such a case a fixed illumination is preferred. This basic illumination can be extended by using a switchable illumination unit, which provide e.g. two or even more discrete illuminating wave fields on demand. A multi-directional scanning illumination unit or a continuous angular scanning illumination unit add however complexity and technological risk. A multi-directional or a continuous angular scanning illumination unit causes reduced tolerances, which can be accepted within the SLM arrangement, which however adds further costs.

This means that e.g. wedge-based, zigzag-based, wave guiding-based, frustrated total internal reflection (FTIR)-based or grazing incidence-based illumination units which are modified by using e.g. a polarization type liquid crystal grating having actively controlled electrodes are preferred neither for the complex valued SLM described in the present invention and nor for a stacked sandwich type complex valued phase+amplitude SLM.

In a further advantageous embodiment of the present invention it can be provided that the light passing both the phase modulating pixels and the amplitude modulating pixels of the SLM is reflected by a mirror system in between arranged in the reflection plane. The mirror system can comprise mirror segments.

Furthermore, the spatial light modulator device can comprise at least one transparent substrate, the transparent substrate has on one side an addressable transmissive layer having the phase modulating pixels and the amplitude modulating pixels and on the other opposite side a plane which is the reflection plane, where the mirror system is arranged in the reflection plane. In this manner a SLM is created with which the light beam incident on the entrance plane of the SLM is directed preferably to the phase modulating element, and is modulated in phase by this phase modulating element. Then the light beam is further directed to a respective mirror segment of the mirror system in the reflection plane, where the light beam is reflected on the mirror segment and is directed back to the amplitude modulating pixel. The amplitude modulating pixel modulates the incident light in its intensity where then the light exits the SLM towards the space of the user of a reconstructed scene.

The SLM is therefore designed here advantageously as an SLM sandwich. The amplitude modulating pixels and the phase modulating pixel can thus be provided in the same plane of the SLM, so that no single amplitude-SLM and no single phase-SLM have to be provided to construct a phase-amplitude-SLM. The SLM can thus be very flat in its design so that also the display can be designed in a flat manner. In other words, a small form factor can be realized.

For this the mirror segments of the mirror system can be arranged opposite to the phase modulating pixels and the amplitude modulating pixels in such a way that each mirror segment covers both a part of the phase modulating pixel and a part of the amplitude modulating pixel. In this way the light can be directed preferably in form of a zigzag from the phase modulating pixel/amplitude modulating pixel via the mirror system to the amplitude modulating pixel/phase modulating pixel of the SLM so that the amplitude modulating pixels and the phase modulating pixels can be arranged in the same plane of the SLM.

In a further advantageous embodiment of the present invention the display device can comprise a polarization selective element, preferably a polarization analyzer or wire grid polarizer, where the polarization selective element is provided at a light exit plane of the spatial light modulator device, seen in the propagation of the light. Polarization management/application can be used to reduce disturbing crosstalk between neighboured modulator pixels. Therefore, the optimal polarization state which is required for the modulator pixels must be provided. In addition, complex-valued or e.g. even just an amplitude apodization profile of single exit apertures of the SLM can be provided by using absorptive pattern or spatially structured polarization structures, as e.g. spatially structured retardation, polarization selective reflection or polarization selective transmission.

This means e.g. that the amplitude modulating pixels can be designed for a defined entrance polarization state which is orthogonal to the entrance polarization state hitting the phase modulating pixels first. Thus, diffraction at the entrance plane which introduces crosstalk is blocked out. For small propagation distances present within the phase and amplitude combining display device this additional modification is not required.

Further, the phase modulating pixels can comprise reflection means, preferably mirror elements, where the reflection means are provided at back ends of the phase modulating pixels, seen in the propagation of light. This embodiment is preferred when using a backlight illumination unit so that the light preferably first incident on the phase modulating pixel is reflected towards the reflection plane and from there to the amplitude modulating pixel. A zigzag light beam is thus provided.

In a further embodiment a polarization filter can be provided in the plane of the phase modulating pixels and the amplitude modulating pixels, where the polarization filter comprises polarization filter segments. The polarization filter segments can be assigned to the phase modulating pixels and the amplitude modulating pixels, where the polarization orientation of adjacent polarization filter segments is orthogonal. The polarization filter segments can be absorptive type polarization filter segments which are provided at light exit apertures of the amplitude modulating pixels, or the polarization filter segments can be reflective type polarization filter segments, preferably wire grid polarizers, which are provided at the reflecting back ends of the phase modulating pixels, seen in the propagation of light.

Advantageously, an apodization filter, preferably a patterned apodization profile layer and/or a retardation element, preferably an achromatic or apochromatic retarder layer, can be provided. The apodization filter can be a micro lens-like structure applied onto the mirror system in the reflection plane or the apodization filter can also be an absorptive alloy composition layer. For instance, a micro lens-like surface relief profile can be pressed top down onto a glass plate which has a thin layer on top of it, which is e.g. an absorptive UV-curing adhesive. Thus, the parts of the surface relief structure having direct contact to the glass plate appear to be perfectly transparent. At these contact points now absorptive material is present between the e.g. micro lens-like surface relief structure and the glass plate. The absorptive adhesive used is cured by switching on UV (ultraviolet) light.

An amplitude apodization filter of the used SLM pixels can thus provide reduced intensity of higher diffraction orders of the SLM. This is due to a reduction of spatial frequencies present within the SLM plane. The shape realized can be e.g. a so-called Kaiser-Bessel window, a Gauss type window or just a cosine function. Thus, the neighboured eye is not hit by disturbing light which was provided for the other eye of a user.

For large pixels of, e.g., approximately 100 μm for TV applications, a printed amplitude structure, which is a continuous profile, can be used which should rather not show a periodic grid. It is preferred is to dip a micro lens-like structure having a defined pixel pitch and facing down into an absorbing paint, which can be placed onto a mirror substrate. The contact points within the micro lens-like structure are clear and have close to 100% reflectivity. The regions between the lenses of this structure are dark. This works very well for a reasonably large pixel pitch.

Another option for an apodization filter is to use absorptive alloy compositions such as chromium oxides, which are used e.g. for so-called bulls eye or anti-Gauss filters already. The local thickness of such compositions defines the absorption. A reasonably thick layer of e.g. approximately 200 nm can be locally thinned by using grey-tone lithographic approaches (also called gray-tone, grey-scale, gray-scale or half-tone lithography). For instance, a grey-tone lithographic negative lens type array which is structured in photoresist (PR) can be etched dry or wet chemically. The photoresist (PR) acts as protecting material which is used to transfer the surface profile into a profile of an absorptive layer. It is also possible to generate this protective structure by using nano-imprint lithography (NIL) or a classic molding process. The centre of the protective layer has to be thinner than the outer area so that a more transparent centre of the absorbing material can be generated which can be e.g. an alloy compound, or another absorptive material as e.g. platinum black (Pt) or a reasonably strong absorbing material.

A further option can be to use a wire grid-like structure (wire grid polarizer (WGP)) which can be placed in front of an absorber instead of using a mirror plane. Alternatively, an absorptive structured filter can be placed in front of a mirror segment, e.g. in the reflection plane or in the plane of the pixels. In both functionally opposite cases, the reflected light has a defined distribution of the polarization state which can be transferred into an intensity profile by using a polarization filter which acts as an analyzer.

In summary, several technologies can be used in order to provide the apodization profiles which can be required within a holographic display device.

In a further embodiment of the present invention at least one lens array can be provided, where the lens array can be provided in front of the spatial light modulator device, seen in the propagation of light, where the light emitted by the illumination unit is bundled and enters entrance apertures of the spatial light modulator device or in entrance apertures of the spatial light modulator device lens structures are provided to focus the light.

The lens array can be a two-dimensional (2D) lens array or a cylinder lens array which is also referred to as lenticular. This lens array can be placed in front of the SLM (seen in the propagation of light) that is e.g. between the illumination unit and the SLM in order to focus the light onto the transparent entrance zones of the SLM. This increases the divergence of the light but the layout of the lens array can be adapted to the illumination present. A second lens array can be provided which can be placed behind the exit plane of the SLM (seen in the propagation of light) in order to reduce the divergence of the wave front segments. Thus, a telescope array type arrangement is present which uses two laterally shifted lens arrays.

It is also possible to provide a structured illumination of the SLM by using structured light decoupling, e.g. in form of a stripe-like light decoupling, at the exit plane of the illumination unit. In this case an exact alignment of the illumination unit and the SLM structure has to be ensured.

Furthermore, additional curvatures which can be e.g. provided at the mirror segments of the mirror system or of the phase modulating pixels can also be used in order to increase the amount of light which is transferred through the apertures of the phase and amplitude spatial light modulator device, or in order to reduce the crosstalk between adjacent pixels. However, this modification could add additional technological effort and a decreased tolerance value of the mismatch which can be acceptable between aligned components. However, lens structures at plane substrates introduce negligible angular variations only. Thus, lens arrays or lens structures which increase the transmission, increase the effective fill factor (FF) or reduce the inner SLM crosstalk are preferred.

Advantageously, the spatial light modulator device of the display device can comprise a beam displacing element, preferably a birefringent element, more preferably a Savart plate, where the transparent substrate is designed as the beam displacing element for shifting the incident light passed the phase modulating pixel or the amplitude modulating pixel, depending on which pixel, phase modulating pixel or amplitude modulating pixel, the light passes first in the propagation of light. A Savart plate as beam displacing element can also be used to realize a serial combination of adjacent phase modulating pixels and amplitude modulating pixels. The light which passes the phase modulating pixel is shifted by the beam displacing element. The light which is shifted by the beam displacing element is changed in polarization and reflected back to the pixel plane. Thus the phase modulated light hits the amplitude modulating pixel and can then be modulated in its amplitude.

The spatial light modulator device of the display device can advantageously comprise a backplane which comprises clusters having buried electrodes and additional transistors along with transistors for controlling the pixels, where the electrodes and the additional transistors are arranged behind the reflection means of the phase modulating pixels of the spatial light modulator device, seen in the propagation of light.

Several modifications can be provided regarding the electronic design and layout of the display device.

The effective fill factor (FF) of a transmissive type SLM of well-known display devices is for instance close to 0.5. This means that there is an area on the SLM which does not have to be transparent and which can be used for a plurality of modifications. This area occupies approximately 50% of the display panel of the SLM.

The design of the backplane which is the electronic circuit of the display panel can profit from the resulting fill factor which is present for the transmissive type SLM.

The fill factor is an issue in regard to the efficiency of the transmission of light. At first view this might be a general clause but this applies especially for displays which are used close to the user as e.g. mobile tablet type displays. The critical dimension (CD) of a lithographic process defines the processes which have to be used and the costs. Technology uses for integrated circuit manufacturing providing a constant and high fill factor even for decreased pixel size might not be practical for display devices because of the costs per square meter. This means that the use of lithographic processes which are standard within display manufacturing and which are limited in regard to the critical dimension obtained will result in a reduced fill factor if the dimensions of the pixels are reduced. Furthermore, advanced driving schemes which require additional transistors and electrode lines compared to standard active matrix approaches would decrease the fill factor even more. That is why the use of this extra 50% of space is very advantageous especially for displays which have small pixels (approx. 50 µm), which is e.g. the case for mobile holographic displays.

The SLM provides approximately 50% of the display panel area for non-transparent structures. This means that the non-transparent area can be used e.g. for metal electrode lines and transistor structures, which can occupy approximately 50% of the display panel plane. Thus, larger critical dimensions of the lithographic process are possible. Or more complex backplanes can be realized.

The increased area, which does not have to be transparent gives the opportunity to use e.g. a value-sorted backplane as disclosed in WO 2012/028678 A1 for mobile holographic displays. This backplane separates the primary signal required for all pixels of the display device into a high-frequency-low-current signal used for the addressing of the pixels and a low-frequency-high-current, ramp up and ramp down signal, which is directed to the pixel capacities and which finally changes the orientation of the liquid crystal molecules of the addressable transmissive layer. The value-sorted backplane, also referred to as cluster backplane, provides the control of a high pixel count at high frame rates with low loss of energy and with a Bit depth of e.g. 8 Bit, 10 Bit or even more. The complexity is higher than that of a standard type active pixel matrix. Additional electrodes and additional transistors which are provided to implement address decoders are used in comparison with the standard type active pixel matrix approach. This is not a problem for TV displays and also can be handled for desktop displays, but it is not practical for a pixel pitch of e.g. 12 µm because of the small fill factor which would be present if e.g. using a critical dimension of CD=2 µm. This means that the advanced driving scheme which is provided by the value-sorted backplane is not practical for very small pixels having an extent of e.g. 10 µm to 15 µm.

Buried electrodes and additional transistors can be placed advantageously behind the reflective parts which are allocated to the phase modulating pixels, seen in the propagation of light. Thus, by using the non-transparent zones relaxed design rules can be obtained even for a small pixel pitch of e.g. 12 µm which can be used e.g. for a mobile two-dimensionally encoded mobile holographic tablet type display. In summary, the use of non-transparent zones is very advantageous for mobile holographic displays.

Further, for reducing the amount of transparent electrode material it can be provided advantageously that the transparent electrodes of the clear existing electrodes of the backplane can be combined with metal rim type electrodes. Thus, only the part of the clear aperture used has to have a clear aperture. The amount of transparent electrode material is thus decreased down to the minimum. Another effect is that the electrode mobility of the metal electrodes can provide a reduced loss of electrical energy and a slightly increased switching speed too.

For example, an ITO (indium tin oxide) layer can occupy an inner area only which is equivalent to the clear exit aperture of a pixel. The outer rim of a rectangle or square-shaped pixel electrode can be formed by using metal lines. This is rather to reduce the amount of e.g. an ITO layer used than to add significant switching speed. This is due to the fact that the propagation length of the electrons within the ITO layer is relatively small. Only in those embodiments using electrode lines in the >100 mm range a significantly decreased switching speed can be obtained.

In a further preferred embodiment of the present invention a light emitting device, preferably an organic light emitting diode array can be provided behind the pixels of the spatial light modulator device seen in the propagation of light, preferably provided on top of the non-transparent areas of the phase modulating pixels, to generate a two-dimensional functionality of the display device, where the light emitting device, preferably the organic light emitting diode array, can be composed of clusters having light emitting zones, where a cluster can cover a specific number of pixels of the spatial light modulator device.

A light emitting device or an organic light emitting diode (OLED) array can be placed preferably on top of the non-transparent areas, on the back side, of the phase modulating pixels. Although the pitch is as small as defined by the complex-valued phase and amplitude spatial light modulator device clusters or blocks of e.g. 5×5 light emitting zones can be addressed in order to generate a two-dimensional (2D) image pixel. OLED emission provides light with a wide spectral and angular range. The main portion of this light, that is e.g. >90% will pass volume gratings which can be provided behind the SLM, seen in the propagation of light, and which e.g. realize the function of a field lens without being redirected. Additional scatter structures can be provided within the OLED emission areas.

The non-transparent area of the display panel thus provides the opportunity to integrate a backplane of an OLED type light emitting device and an OLED-clustered pixel structure without effecting a holographic three-dimensional operation.

To use transparent OLEDs within the transparent areas of the display panel which means e.g. in front or behind the SLM, seen in the propagation of light, could introduce significant scattering. However, this is not preferred.

In general this modification is not limited to the use of OLED. LED (light emitting diode) or e.g. quantum dot (Q-dot)-based conversion of light also can be used in a plane of light emitting pixels added to the complex value providing SLM which modulates phase and amplitude values of partially coherent light.

Advantageously, the spatial light modulator device of the display device can be a liquid crystal (LC)-based spatial light modulator device or a micro electro mirror system (MEMS)-based spatial light modulator device.

Alternative SLM configurations are possible. For instance, the spatial light modulator device of the display device can be a multiple quantum well (MQW) based spatial light modulator device. This type of modulator, which can work in reflection or in transmission, can be designed in order to modulate amplitude and/or phase. In general the principle of the serial combination of adjacent phase modulating pixels and amplitude modulating pixels can also be adapted to non-liquid-crystal based phase and amplitude modulating SLM. For instance, electro-wetting (EW)-based SLM and magneto-photonic crystal (MPC)-based SLM can be used. Electro-wetting (EW)-based amplitude modulating can be realized by using absorptive fluid and phase shifting/modulating can be introduced by using a tilt of a plane parallel segment which can be implemented by using an electro-wetting cell which is filled with three fluids as disclosed in WO 2010/084200 A1.

Further, additional SLM alternatives are described. Micro electro mirror system-based (MEMS) spatial light modulator devices and electro-wetting-based spatial light modulator devices can be used to provide amplitude modulation or/and phase modulation. A plurality of different MEMS based and electro-wetting based spatial light modulator devices which are state of the art can be used within the display device according to the invention.

In the following a preferred MEMS-based SLM embodiment is described. Phase modulating pixels working in transmission can be realised by using piston mirrors which can operate at frame rates of up to 10 kHz. Amplitude modulating can be obtained by using e.g. interference-based MEMS arrangements which can be optimized separately for red, green and blue light in order to realize an SLM which has a pixel pattern relating to those tree colours. It is also possible to use one type of amplitude modulating MEMS based SLM for all colours in a time-sequential way.

A pixel size that is a practical one in regard to the MEMS-based SLM described in this document is for instance 8 µm×16 µm, 10 µm×10 µm or 12 µm×15 µm. The piston to be realized is defined by the wave length and the entrance angle of the light incident on a MEMS mirror. A practical value of the piston to be introduced for red light is within the range of 0.3 µm to 0.33 µm. The value of the piston for blue and green light is less than the value for the red light.

Reflective type piston mirror arrays are state of the art. This means that the transfer of this technology, which is currently available at mirror-array sizes of typically 10 mm×10 mm and up to 100 mm×100 mm for a few applications for instance to mobile type displays which can have a size of e.g. 300 mm×200 mm is practical. This is the size of the entire array and not the one of a single mirror. On the other hand, reflective type amplitude modulating panels which are based on a destructive interference effect have been realized in much larger sizes already.

Amplitude modulating pixels which are based on a destructive interference effects can be used for transmissive type and reflective type SLMs. For instance a metal interference filter (MIF)-based approach can be used as amplitude modulator in order to generate variable amplitude levels by introducing an adapted distance between two metallic layers. In more advanced embodiments dielectric multi-layer stacks can be used, too. For instance, a wave entering a dual metal layer interference filter will be partially transmitted through a first layer and also partially transmitted through a second layer. The light propagating back and forward will form a standing wave if the wavelength and the angle of incidence match that is fulfil the $\lambda/2$ modulo $2\pi$ criterion. If the $\lambda/2$ modulo $2\pi$ criterion is fulfilled then the nodes of the standing wave which is present between reflecting planes are on a metal plane and do not carry significant energy, which means that the transmission through the dual metal layer interference filter is maximized and is e.g. t=0.8. Detuning the dual metal layer interference filter means detuning the optical distance present between the metal layers. This means to change the exit energy. Thus, amplitude modulation is obtained.

Metal interference filter (MIF) based pixels can also be designed for an SLM working in reflection.

Higher spectral selectivity can be obtained by increasing the number of metal layers to >2. Thus, several resonators, which mean several optical designs of them, have to be taken into account, which gives a narrowed response function.

So far, piston type mirrors for modulating the phase and interference based resonators (interference-based MEMS arrangement) for modulating the amplitude are described. Both can be realized by using MEMS technology which is capable of high frame rates.

Interference based resonators for modulating the amplitude can also be realized by using liquid crystal material (LC) placed between metal layers. A small detuning of the refractive index gives a sufficient change of the amplitude leaving the pixel. In addition, materials showing $\Delta n(U)$, $\Delta n(I)$ or e.g. $\Delta n(h\nu)$, where $\Delta n$ is the refractive index variation, U is the voltage, I is the current and $h\nu$ is the energy of a photon, can be provided between metal planes in order to realize an interference based amplitude modulating pixel. Polymers, crystals and doped variants of these are state of the art and can be adapted to the embodiments according to the invention.

MEMS-based rotating of a reasonably thin birefringent film is possible. This would be equivalent to the well-known Hariharan phase modulation and could be used for phase shifting/modulation and amplitude modulation, which requires at least one additional polarizer, too. Due to the fact that tip mirror arrays are already known, the implementation of this modulation into a reflective pixel can be a faster way than implementing this into a transmissive type pixel using this kind of modulation. For example twisted hinges can provide the rotation required here. Thus, a piston mirror embodiment which uses twisted hinges can be used for this. Additional phase shifts which will be present as e.g. within a reflective setup can be provided and the related phase shift of a phase modulating pixel can be addressed dependently in order finally to realize the complex value required. Further MEMS modifications can be used to implement e.g. the Hariharan or other phase modulation principles here, which means within amplitude or within phase modulating embodiments or even within embodiments, which combine both modulations within one pixel.

According to the invention, it can further be provided that the illumination unit comprises at least one volume grating for decoupling the light out of the illumination unit towards the spatial light modulator device.

The decoupling volume grating can realize the required exit angles of the illumination.

Advantageously, the display device can comprise a field lens where the field lens is in particular a combined field lens comprising at least one volume grating.

For example, a reflective type complex-valued SLM according to the invention can further be adapted to a volume grating-based field lens used in the display device according to the invention. For this purpose, a combined volume grating (VG) field lens has a first volume grating (VG) which realizes a plane to plane reconstruction which can be e.g. 0° deg (on axis) to 30° deg slanted plane wave. A second volume grating (VG) has a reconstruction of 30° deg plane wave to on axis field lens. The combination of these two volume gratings provides an on-axis volume grating field lens which can be referred to as combined field lens.

Preferably, a slanted illumination resulting in off-axis propagation of the complex-valued light can be used in order to eliminate the first volume grating of the combined field lens. For example, the SLM plane comprising the phase modulating pixels and the amplitude modulating pixels to be combined can be illuminated at 30° deg which results in −30° deg off-axis propagation of the modulated wave field. Thus, the pre-diffraction volume grating which formerly was used as first element of the combined field lens is no longer required. In this manner the number of components used can be reduced.

Further, according to the invention it can be provided that the display device further comprises a vertical tracking unit and/or a horizontal tracking unit, where the vertical tracking unit and/or horizontal tracking unit comprise preferably (at least one) liquid crystal grating.

The vertical tracking unit and/or the horizontal tracking unit is preferably provided for angular fine tracking behind a complex valued SLM, seen in the propagation of light.

In addition to the plane used in order to introduce the angular tracking the angular tracking unit(s) has (have) to fulfil conditions which are related to the coherent nature of the illumination used.

Thus, a segmentation of the tracking unit(s) which is larger than the pixel pitch used is not preferred. A lens array which can also be used in combination with e.g. ±15° deg angular tracking is also not preferred. The disadvantage here is not the additional thickness added, but the segmentation which has e.g. a 5 mm to 10 mm pitch. And this also applies for electro-wetting-based prism cells which can be used in the tracking unit and which can be provided in front or behind the SLM, seen in the propagation of light. Preferred is to use liquid crystal polarization gratings having individually controlled electrode lines.

For instance, liquid crystal gratings electrically controlled by individually controlled and one-dimensionally arranged electrode lines can generate one-dimensional phase profiles. These controllable one-dimensional phase profiles can provide a wedge function required for fine tracking of the light to be sent to the eye of a user. Furthermore, cylindrical phase functions can be generated. Thus, in addition to providing fine tracking by generating different grating periods and different local phase tilts, cylinder lens functions can be generated which reduce overall aberrations of tilted lens functions. Several gratings can be used in series. Thus, e.g. two gratings can be stacked onto each other which have an angular offset of 90° deg. It is also possible to use one grating having vertically orientated electrodes and providing horizontal fine tracking in combination with two additional gratings having electrodes, which are orientated parallel to the two crossed display diagonals.

One advantage of using controllable phase gratings is to provide fine tracking without adding significant thickness or a Moiré pattern.

One option is to use out of plane liquid crystal rotation in order to generate saw-tooth phase gratings, which suffer from rounding effects at $2\pi$ to 0 phase steps, which reduces the diffraction efficiency for small phase grating periods of e.g. <3 µm to a non-practical value of less than 0.5.

An in-plane rotating liquid crystal mode as e.g. the so-called HAN mode can provide a controllable phase grating which does not suffer from rounding effects at $2\pi$ to 0 phase steps.

This is due to the fact that the absolute value of a liquid crystal in-plane rotation angle which is related to a phase value of e.g. 1.9 times $\pi$ and one, which is related to a phase value of 2.1 times $\pi$ which is equivalent to 0.1 times $\pi$ differ in approximately 10% only. As a result, phase gratings based on periodically arranged in-plane rotation of a birefringent material can provide a high diffraction efficiency of $\geq 0.9$ even for a grating period of 2 µm. Discrete values are dependent on the absolute value of the birefringent and thus to the period to thickness ration of the phase grating which is e.g. realized by using an in-plane rotating liquid crystal mode.

The object of the invention is also achieved by a method according to the claims.

The method according to the invention is provided of generating a holographic reconstruction by using a display device according to the invention, where Illuminating of phase modulating pixels and amplitude modulating pixels of a spatial light modulator device by an illumination unit with sufficiently coherent light, Passing of the light of both the phase modulating pixels and the amplitude modulating pixels of the spatial light modulator device, and Reflecting the light by a reflection plane in between, where the reflection plane is provided in the light propagation between both the phase modulating pixels and the amplitude modulating pixels.

BRIEF DESCRIPTION OF THE DRAWINGS

In the following, the invention will be described in more detail on the basis of embodiments and in conjunction with the accompanying schematic drawings. Generally preferred configurations and developments of the teaching are also explained in conjunction with the explanation of the preferred exemplary embodiments of the invention with reference to the drawing.

In the drawing, the figures are side views unless otherwise specified, where the drawing is in each case a schematic illustration.

DETAILED DESCRIPTION OF THE INVENTION

Like reference designations denote like components in the individual figures and accompanying description. In the following, the designations "in front of" and "behind" e.g. in front of the spatial light modulator device mean the light seen in regards to the propagation of the light.

The illumination unit can contain several specific modifications to be used preferably within a holographic display device. The illumination unit can be used for coherent light and for light which only shows reduced spatial and/or temporal coherence. Amplitude apodization and phase apodization can be used to optimize the intensity profile which propagates behind the entrance plane of the illumination device. Colour filters give the opportunity to optimize this for different colours separately. The specifications are dependent on the discrete embodiment.

Figure 1:
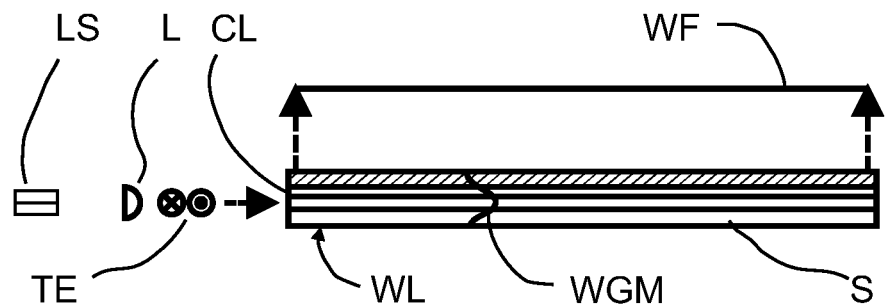
FIG. 1 shows a planar wave guide type illumination unit for a display device according to the invention.

Now to an optical setup of an illumination unit, FIG. 1 illustrates a first embodiment of a flat illumination unit for a display device, preferably a holographic display device. The illumination unit is a planar wave guide-type illumination unit which shows sufficient separation between an illumination beam path and an imaging beam path for being used as front light illumination unit. This front light illumination unit can be used in order to illuminate a complex-valued reflective-type spatial light modulator device (SLM) which is shown e.g. in FIG. 6.

FIG. 1 shows a generic layout of the planar wave guide-type front light illumination unit which can be used for comparatively small display devices with diagonals of e.g. up to 300 mm. This embodiment also can be used as backlight illumination unit. The illumination unit comprises a laser diode as light source device LS and an optical element in form of a lens L for the collimation of light emitted by the light source LS to a light guiding element in form of a substrate S. The substrate S comprises on a light exit plane a light decoupling element VG, which can be a volume grating or another type of grating or periodic structure, which e.g. can be based on plasmon resonance. The volume grating VG is provided for decoupling the light which propagates in a wave guide mode WGM, e.g. a basic Gauss mode at a mode number m=0, within the substrate S. Further, the substrate comprises a wave guiding layer WL and a cladding layer CL providing between the substrate S and the volume grating VG. The diffraction geometry of the decoupling volume grating VG is close to a polarizing beam splitter geometry to provide sufficient separation of an illumination beam path and an imaging beam path, that is e.g. 80° deg illumination beam path/0° deg imaging beam path instead of the 90° deg illumination beam path/0° deg imaging beam path geometry. This is one of several diffraction geometries which provide the separation of orthogonally polarized light. Furthermore, the decoupling volume grating VG can realize the required exit angles of the illumination out of the substrate S, where the exit light having the required propagation angle will later illuminate the spatial light modulator device. The required exit angle is dependent from the thickness of a substrate within the spatial light modulator device (herein after referred to as SLM), where the substrate is provided between an addressable transmissive layer and a reflection plane within the SLM. The E field of the light preferably lies in the plane of the substrate and is hence transverse-electric (TE) polarized. The direction of light propagation is indicated by the arrow.

The illumination unit according to FIG. 1 works as follows: The light propagates through the substrate S as light guiding element parallel to the light guiding element, the interface of cladding and output coupling grating. A part of the light leaves the light guiding element, passes the cladding layer CL and enters the light decoupling element here in form of a volume grating VG, where the remaining part of light continues to propagate through the light guiding element. The light which is present behind the cladding layer CL and which enters the volume grating e.g. at an angle close to 80° deg is decoupled by the volume grating VG such that it falls on a not shown spatial light modulator device SLM as a collimated wave field WF. This is indicated by the dotted arrows. After modulation by reflective pixels of the spatial light modulator device (herein after referred to as SLM), the light passes through a λ/4 layer, also known as quarter wave plate, of the SLM and the illumination unit again. After the second passage of the λ/4 layer, the initial transverse electric polarization TE of the light is turned by 90° deg. The light now has a transverse-magnetic (TM) polarization and is modulated by the pixels with values for the presentation of information.

This layout shown in FIG. 1 cannot only be used as front light illumination unit but also as backlight illumination unit.

Figure 2:
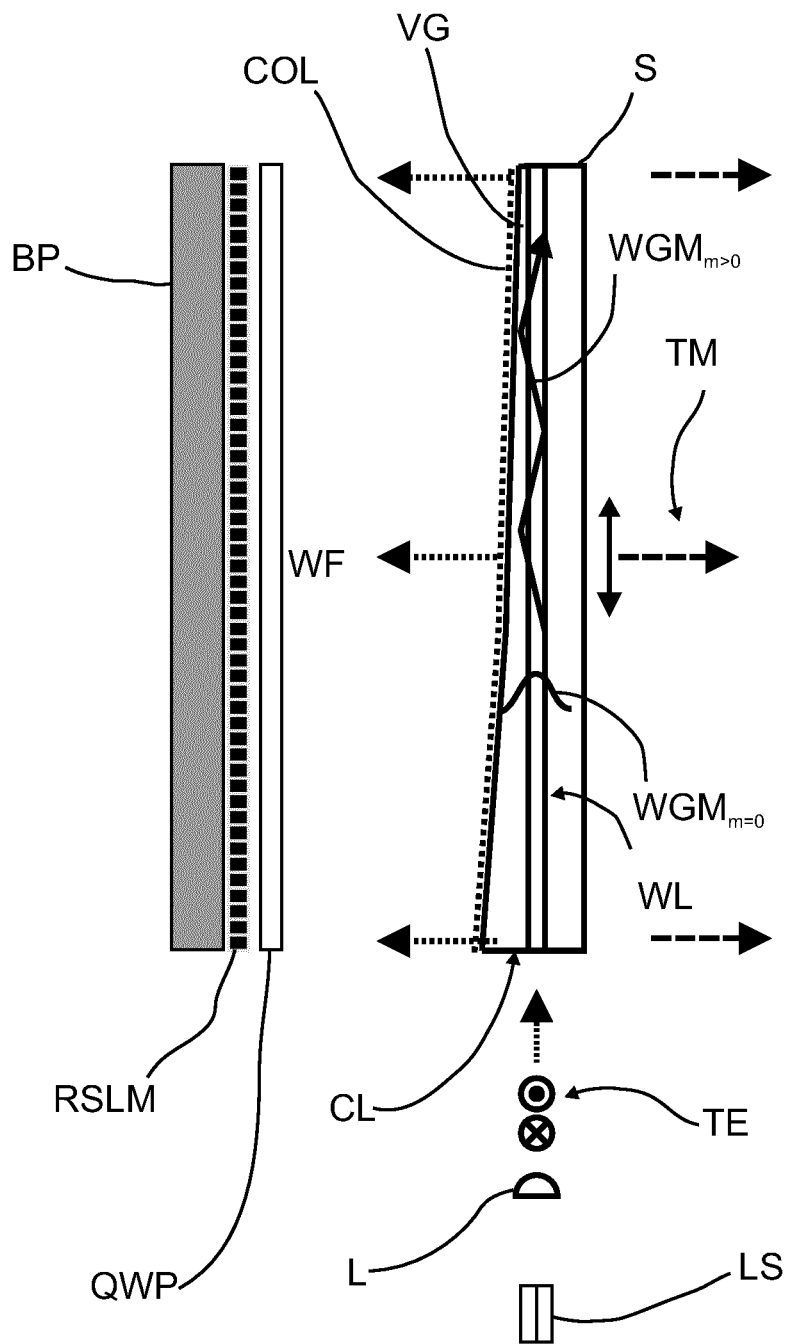
FIG. 2 shows a planar wave guide-based front light illumination unit.

A further planar wave guide-based front light illumination unit is shown in FIG. 2 in a side view. This front light illumination unit uses polarization selective beam path separation. In this figure further optical and electronic elements are provided in addition to the optical elements seen and described in FIG. 1. Here, a reflective-type spatial light modulator RSLM is illustrated where behind the RSLM a backplane BP for the circuit of the pixels is arranged. In front of the RSLM a quarter wave plate QWP also referred to as λ/4 plate is provided for turning the polarization of the light. The light which propagates through the substrate S has first a wave guided mode $WGM_{m=0}$, this means that this mode is a basic mode or a Gauss mode. Later in the substrate S as light guiding element the light has a wave guide mode $WGM_{m>0}$ with higher modes. The principle of the illumination unit of FIG. 2 is essentially the same as in FIG. 1. The layer marked as conversion layer COL herein is a layer providing the decoupling of the light which is basically a conversion of a guided mode of a wave field into a leaky mode. The functionality can be provided by using a volume grating VG. Thus, the denotations COL and VG can be taken as equivalent here. To explain the function of the successive decoupling of the light the longitudinal change of the optical thickness of the cladding layer CL which is n times d, where n is the refractive index and d is the thickness, is overstate.

In the case of using volume gratings as light decoupling elements a set of discrete diffraction angles can be used in order to provide polarizing beam splitter (PBS) as a beam separation means. This means that several discrete diffraction angles can be used for this polarizing beam splitter operation. But not all arbitrary angles can be selected for this. Volume gratings can realize polarizing beam splitter operation at diffraction angles of e.g. 90° deg, 60° deg or 48.2° deg. To place a limit on some discrete angles which can be used only is equivalent to a limited freedom of the optical design.

Figure 3:
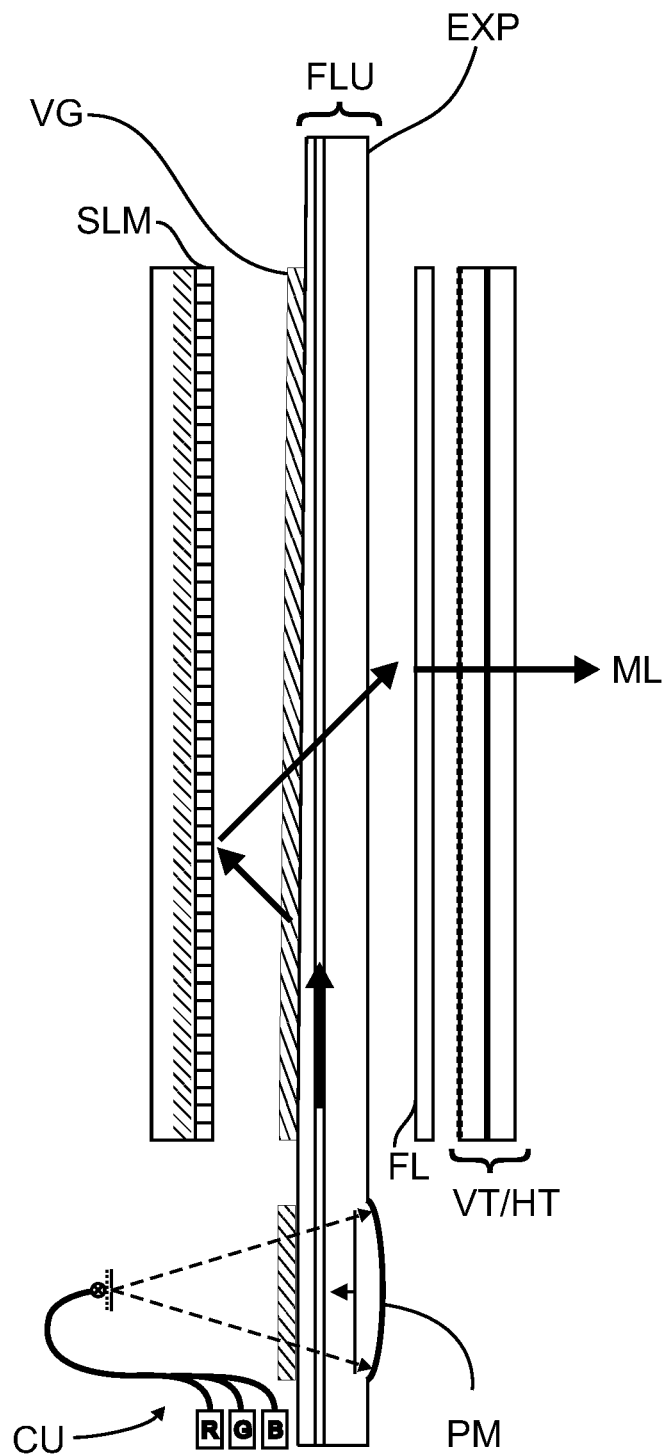
FIG. 3 shows a further planar wave guide-based front light illumination unit.

In FIG. 3 a different planar wave guide-based front light illumination unit is described where angular selective diffraction of volume gratings is used in order to provide beam path separation. The front light illumination unit is here referred to as FLU. The light source LS is here designed as colour light source comprising three single light sources, each for the colours red, green and blue. A collimation unit CU is provided behind the light source LS. The collimation unit CU comprises a reflection element, preferably a parabolic mirror PM, used for collimation instead of a lens as described in FIGS. 1 and 2. A quarter wave retarder can be provided on an exit plane EXP of the illumination unit FLU. In the propagation of light a field lens FL is provided for focussing the modulated light ML to a user space. The field lens can be a volume grating of a stack of volume gratings. Behind this field lens FL a vertical tracking unit and/or a horizontal tracking unit is/are arranged for tracking the light in a required direction. The use of an angular selectivity here provides an increased freedom of design in regard to the angular geometry which can also be used. However, the use of the angular selectivity is preferred.

Figure 4:
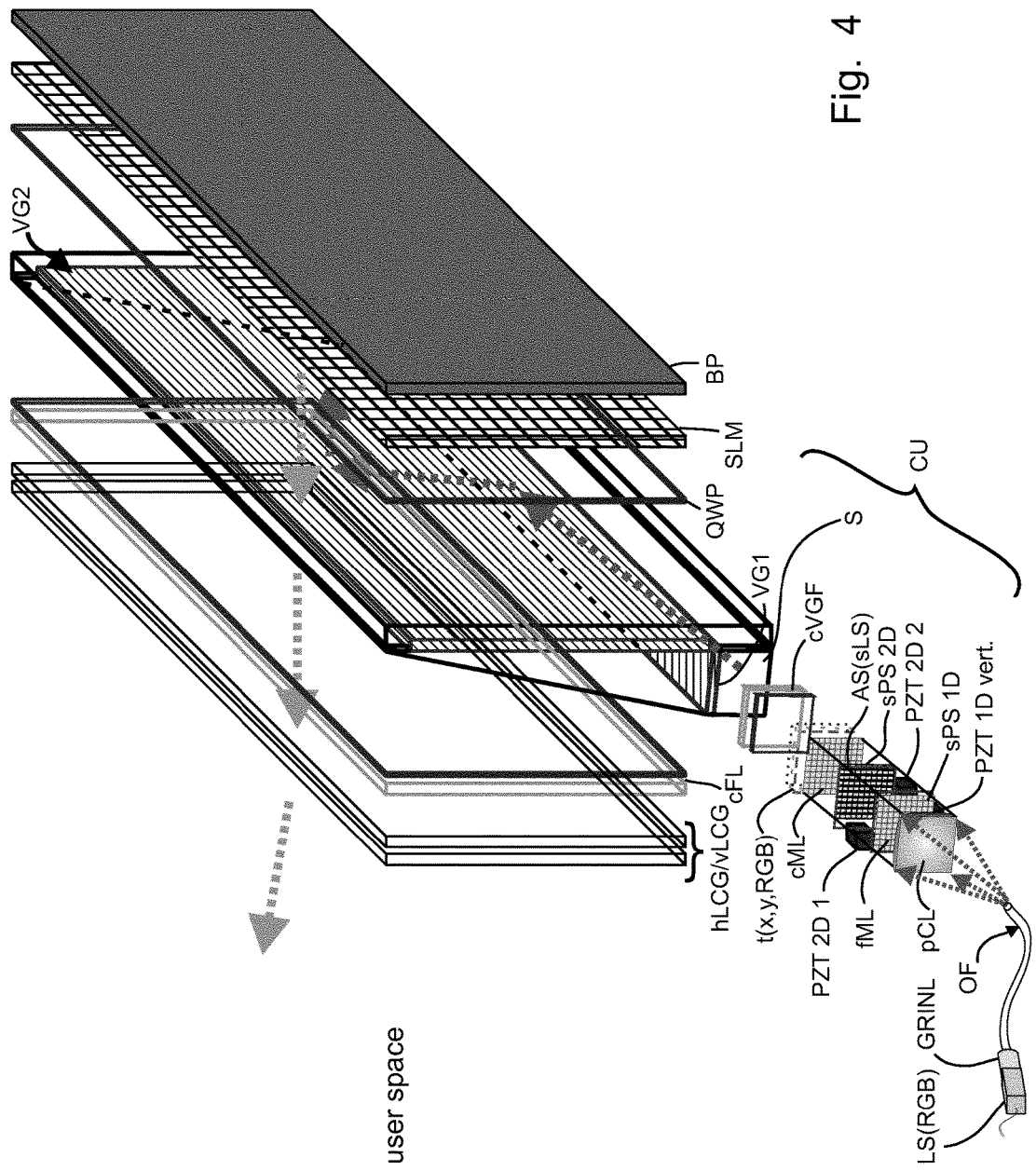
FIG. 4 shows a wedge type-based front light illumination unit for a display device according to the invention.

A further alternative illumination unit is described in FIG. 4. This wedge-type-based front light illumination unit uses an angular or a polarization selective beam path separation. A wedge-type illumination unit can be preferred for mid-size which is e.g. a display with a diagonal of 24 inch to 32 inch and larger displays as e.g. TV size display (e.g. 1 m diagonal) due to a reduced complexity if compared with e.g. a wave guiding or zigzag light guiding illumination unit as shown in FIGS. 1 to 3.

The front light illumination unit according to FIG. 4 comprises a light source device LS for red, green and blue light. At an exit plane of the light source LS a gradient-index lens GRINL is provided which e.g. is a glass rod having a graded-index profile. The graded-index profile has—for a positive number of the focal length f—a high refractive index at the optical axis and decreased refractive index at the outer region. By using an optical fibre OF the light emitted by the light source LS is guided to a collimation unit CU. The collimation unit CU comprises a primary collimation lens pCL, a focussing micro lens array fML, a PZT element PZT 1D for a one-dimensional movement of a one-dimensional scatter foil sPS 1D, a structured periodic scatter plane sPS 1D for a one-dimensional scattering, a structured periodic scatter plane sPS 2D for a two-dimensional scattering, a first piezo translation stage element PZT 2D 1 for a one-dimensionally horizontal movement which finally gives a two-dimensional movement of a scatter plane, a second piezo translation stage element PZT 2D 2 for a vertical movement which finally gives a two-dimensional movement of a scatter plane, where both PZT 2D 1 and PZT 2D 2 together enable a two-dimensional movement. The collimation unit CL further comprises an array of aperture stops acting as an array of secondary light sources, a collimating micro lens array cML and a compound volume grating filter cVGF for tailoring of the angular spectrum of plane waves (ASPW), e.g. a first, thin (e.g. 5 µm thick) volume grating having an angular acceptance of e.g. 5° deg can diffract disturbing light out of the beam path, a second, thick (e.g. 150 µm thick) volume grating having an angular acceptance of e.g. ⅙° deg can diffract the light to be used back into the beam path, where thus angular filtering can be applied. Behind the collimation unit CU collimated wave fields of red, green and blue light t(x,y,RGB) emitted time-sequentially of the light source LS are provided. The light enters then a wedge-type-based substrate S having a first volume grating VG1 using for a first one-dimensional 10× magnification and a second volume grating VG2 using for a second, orthogonal one-dimensional 10× magnification, where the diffraction angle is selected in such a way that a tenfold magnification is achieved. Then the light is guided to a spatial light modulator SLM with a backplane BP via a quarter wave plate QWP. After modulation at the SLM the light is guided a second time through the second volume grating VG2 to a combined field lens cFL which is an on-axis diffractive lens based on two volume grating, e.g. first pre deflection 0° deg/45° deg, second 45° deg/on-axis lens with focus at mean user distance. At last the light coming from the combined field lens cFL is guided to a vertical tracking unit and a horizontal tracking unit which are formed as a vertical liquid crystal grating vLCG and a horizontal liquid crystal grating hLCG.

The collimation unit CU provides a wave field having a defined angular spectrum of plane waves with which the wedge-type illumination unit is illuminated. The basic principle is to use an extended monochromatic, RGB (red, green, blue) separately, light source LS which has a fast varying randomized phase distribution and which is collimated by a lens. This is also the basic principle of the embodiment described in FIG. 14 which also can be used instead of the collimation unit CU in front of the first volume grating VG1.

The wedge-type illumination unit which is described in FIG. 4 illuminate a reflective type SLM at the desired design angle. Thus, perpendicular illumination, e.g. 10° deg or 25° deg illumination, of the SLM is implemented.

Therefore, the use of angular selectivity is preferred.

Figure 5:
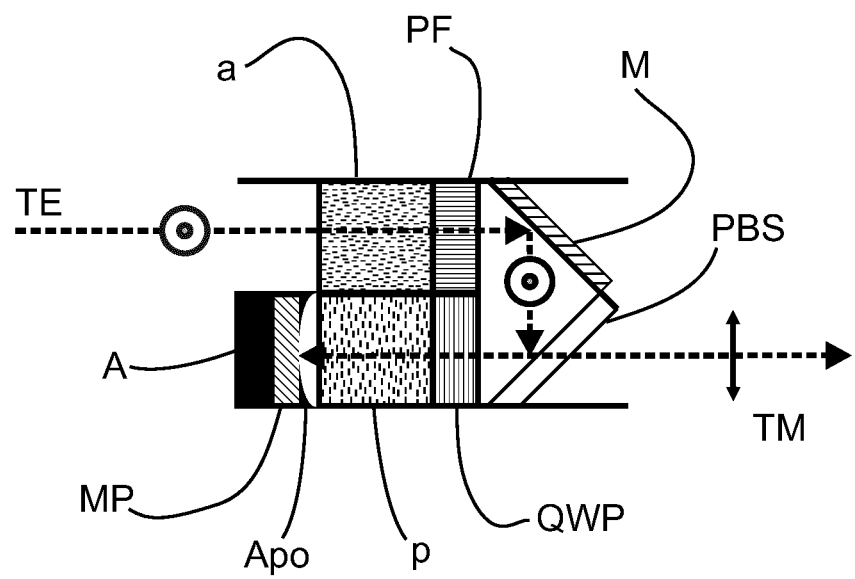
FIG. 5 shows an embodiment of a display device according to the invention, where only a part of a display panel is shown, where a combination of phase modulating pixels and amplitude modulating pixels is provided within the same plane.

In FIG. 5 an embodiment of a display device according to the invention is shown in a top view, where only a detail of a display panel or of a spatial light modulator SLM is shown. A combination of phase modulating pixels and amplitude modulating pixels is provided within the same plane of the SLM in order to realize an in-plane complex-valued SLM. In FIG. 5 an amplitude modulating pixel a and a phase modulating pixel p arranged side by side in the same plane are shown. The amplitude modulating pixel a is placed at the light entrance and the phase modulating/shifting pixel p is placed behind the amplitude modulating pixel a, seen in the propagation of light. This has the advantage to be able to use a constant thickness of an addressable transmissive layer in form of a liquid crystal layer which can be done by passing the phase modulating pixel p two times.

In other words, the basic embodiment is to combine phase modulating pixels p and amplitude modulating pixels a, which are close to each other. A phase modulating pixel and an amplitude modulating pixel form a complex-valued pixel of the SLM. Usually the thickness of the liquid crystal layer required for $2\pi$ phase modulation of phase modulating pixels is twice as high as the liquid crystal thickness required for ON to OFF modulation of amplitude modulating pixels a. As it is shown in FIG. 5, the liquid crystal thickness of the amplitude modulating pixel a can be equivalent to the one of the phase modulating pixel p. This is realized by implementing a double path arrangement for the phase modulating pixel p. The entrance polarization state of the light emitted by the illumination unit is rotated by using segments of a quarter wave plate QWP which are placed in front of the phase modulating pixels p. An apodization profile APO for reducing the intensity of higher diffraction orders is used which are allocated to the combined complex-valued pixel. The apodization profile APO in combination with an absorber A is placed behind the phase modulating pixel p. The redirection of the light passing the amplitude modulating pixel is introduced by using a prism structure, which is placed at one side of the pixel arrangement. The light exit plane of the amplitude modulating pixel a is structured by using a prism arrangement PS, which can be realized by using a molding process. The prism arrangement PS has two reflective surfaces. That is behind the amplitude modulating pixel a slanted mirror plane M is provided which in this case is slanted in 45° deg. Behind the phase modulating pixel p a polarization beam splitter PBS in form of a coating is provided on a slanted plane, preferably slanted in 45° deg, where the both slanted planes M and PBS are inclined to each other under an angle of approx. 90° deg. The polarization beam splitter coating PBS can be e.g. a dielectric mirror stack or a wire grid polarizer structure which are used to redirect the beam path in the direction of the phase modulating pixel p. On the light exit plane of the amplitude modulating pixel a polarization filter is provided which blocks the light reflected by the prism arrangement PS and thus suppresses crosstalk between the adjacent pixels a and p by introducing orthogonal polarization. After modulating of the phase of the light the light is guided to the apodization profile APO at the back end of the phase modulating pixel p. In the plane of the apodization profile APO an in-plane mirror plane MP is provided for reflecting the incident light back to the phase modulating pixel p. The quarter wave plate QWP behind the phase modulating pixel p changes the polarization state TE of the light into the polarization state TM (transversal magnetic), so that the TM polarized light can propagate through the polarization beam splitter coating PBS of the prism arrangement PS towards a following field lens not shown in the display device.

Figure 6:
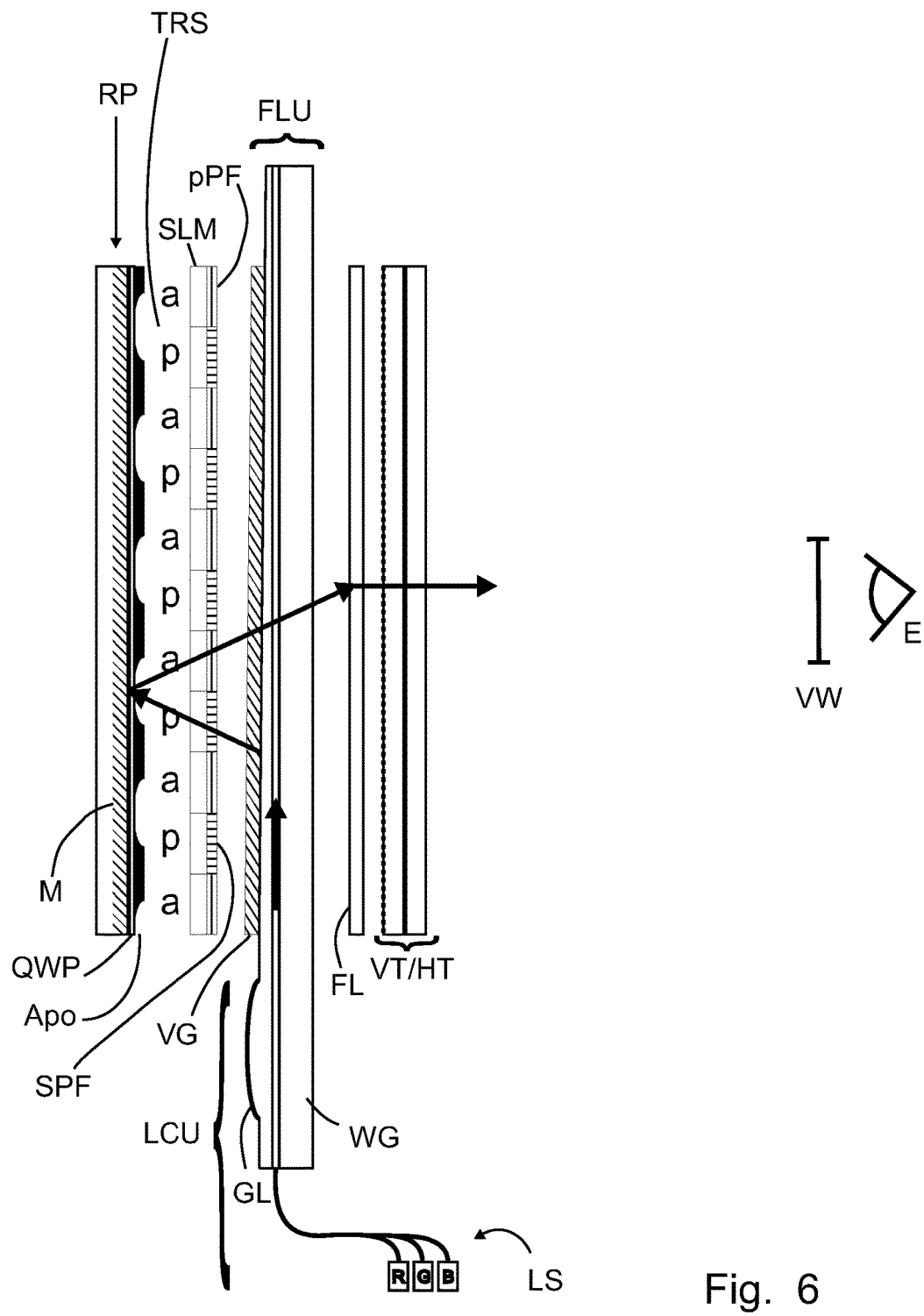
FIG. 6 shows an embodiment of a reflection type complex-valued spatial light modulator (SLM) device according to the invention.

A generic embodiment of a reflection-type complex-valued spatial light modulator SLM is described in FIG. 6 using a serial combination of laterally adjacent phase modulating pixels and amplitude modulating pixels which are placed within the same addressable transmissive layer plane. The addressable transmissive layer for forming the complex-valued pixels is a liquid crystal layer, where also other types of layers can be used. The phase modulating pixels p and the amplitude modulating pixels a are placed side by side.

As can be seen in FIG. 6 slanted illumination of the SLM is provided. The illumination angle of the light incident on the SLM is e.g. 25° deg. This illumination angle is practical for several liquid crystal modes. The incident light on the SLM has a defined polarization state. The light passes first the phase modulating pixels p, while being blocked in front of the amplitude modulating pixels a by using a patterned polarization filter/analyzer pPF. Patterned wire grid polarizer structures could be provided as patterned polarization filter but they are not preferred on top of the amplitude modulating pixels. This is due to the reflected light which will add background noise. However, patterned wire grid polarizer structures can be used in a reflection plane RP which reflects back a defined part of the incident light. In FIG. 6 patterned wire grid polarizer structures can be used in front of a non-structured absorber plane provided in the reflecting plane RP. The absorber plane corresponds to a mirror plane M. Patterned retardation can be added in this reflection plane by using a quarter wave plate/λ/4 plate, too. However, it can be preferred using embodiments which are closer to well-known standard technologies as micro lenses, e.g. dipped face down into an absorptive UV-curing adhesive.

An apodization profile APO in form of a patterned absorber is provided further in the reflection plane RP. This apodization profile APO can be made reasonably thin that is e.g. 3 µm to 5 µm.

One option to obtain a thin embodiment of an apodization profile is to use a combination of a retarder and an analyzer.

A patterned retarder can be used in combination with an analyzer which is a polarization filter. The term patterned is used in this specific content as inner pixel structure or inner pixel pattern. This combination can provide a defined amplitude-type apodization profile within the aperture of a pixel. A patterned analyzer which is a patterned polarization filter can be used in combination with a non-patterned retarder. This combination can provide an inner pixel apodization profile. Furthermore, an additional option is to use inner pixel patterning for both, the analyzer and the retardation structure.

Thus, even SLM which have small pixel pitches as e.g. 12.5 µm, which can be used for mobile devices, can be equipped e.g. with these patterned analyzers which act as thin implementations of inner pixel aperture patterned absorbers.

However, thick patterned apodization providing absorber structures, as e.g. 20 µm or greater, or high aspect ratios are not practical for use in holographic display devices. This is due to shadowing effects when used at slanted illumination and due to diffraction effects. In other words, reasonably thin absorber structures, which e.g. are based on patterned analyzers, have to be used.

In other word, the reflection plane RP comprises the mirror plane M on which the quarter wave plate QWP is placed. On the quarter wave plate QWP the apodization profile APO is placed, where all optical elements in the reflection plane can be combined with each other.

Now to the principle of the display device shown in FIG. 6. The light which is provided by a light source LS in form of laser diodes having different colours propagates along a preferable single mode fibre SMF. A plurality of fibre ends are placed at the rim of a planar wave guiding structure WG. A one-dimensional array of collimating elements, which are here in FIG. 6 geodetic lenses GL, is used in order to provide collimation within the planar wave guiding structure WG. The first part of a used front light illumination unit FLU is referred to as light collimation unit LCU. The light which propagates along the wave guiding structure WG is coupled out by using a volume grating VG. The used exit angle in this embodiment is 25° deg to the axis of the surface normal, where also other angles can be used. Homogeneous illumination requires less technological effort than using segmented decoupling, that is strip-shaped decoupling which requires precise adjustment. The light which is coupled out is e.g. TE polarized. On top of the SLM layer a polarization filter/analyzer is placed, where on top of the phase modulating pixels p a structured polarization filter sPF and on top of the amplitude modulating pixels a patterned polarization filter pPF are provided. Phase modulating pixels p allow for transmission and amplitude modulating pixels a allow to block the incident light. The light passes the phase modulating pixels p and is modulated by them. Then, the light passed the phase modulating pixels p illuminates a reflection plane RP comprising a patterned apodization profile providing layer Apo, a non-patterned quarter wave plate/retarder QWP and a mirror plane M. The order of the apodization profile providing layer APO and the quarter wave plate/retarder can be changed. The light which is reflected back from the reflection plane RP has a polarization which is orthogonal to the initial one meaning e.g. TM here. This light will be modulated by the amplitude modulating pixels a and will be transmitted by them. Broadening of the light will be present due to diffraction. However, light which hits the phase modulating pixels at the way back from the mirror plane M will be blocked by the structured polarization filter sPF of the phase modulating pixels. Due to the angular selectivity of the volume grating VG which is placed at the exit plane of the front light unit FLU the complex-valued wave field passes the front light unit FLU on its way to a field lens FL. If the light exits the SLM under a reasonably large slant angle, e.g. approx. 30° deg, then an off-axis volume grating based field lens FL can be used. This means that no additional volume grating is required, which is placed in front of the field lens FL. This is only the case if a combined field lens is used. The field lens FL essentially provides a viewing window VW at an entrance plane of an eye E of a user. Vertical tracking and/or horizontal tracking of the light can be provided by using a vertical tracking unit VT and/or a horizontal tracking unit HT. The tracking units VT and HT comprise preferably liquid crystal (LC) gratings which have individually controlled electrode lines and an in-plane rotating liquid crystal (LC) mode.

Apodization profiles can also be placed within the SLM plane instead or in addition to the placement of apodization profiles close to the mirror plane M. In addition, the aperture—or filling factor (FF)—of the exit pixels, which are e.g. the amplitude modulating pixels, can be made slightly smaller, e.g. 20% smaller, than the aperture of the entrance pixels, which are be e.g. the phase modulating pixels. This reduces the requirements which have to be fulfilled by a transparent substrate TRS which acts as a spacer between the addressable transmissive layer with the complex-valued pixels and the reflection plane RP. Thus, higher values of the total thickness variation of the transparent substrate TRS are acceptable. Slightly lateral offsets of the designed shift can be compensated by using this approach which reduces the influence of thickness variations of the transparent substrate TRS placed between the plane comprising an addressable transmissive layer and the reflection plane RP. In other words, if a fill factor of an exit aperture or exit aperture stop is used, which is e.g. 0.5, and a wave segment illuminating this exit aperture having the same lateral extent as the exit aperture, then a change of the distance to the reflection plane RP will cause a lateral shift of the wave segment illuminating the exit aperture stop. Thus, the exit aperture is no longer completely illuminated. But if the exit aperture is slightly smaller than the wave segment illuminating it, than a slightly lateral shift of the illuminating wave segment still provides a completely illuminated exit aperture.

Figure 7:
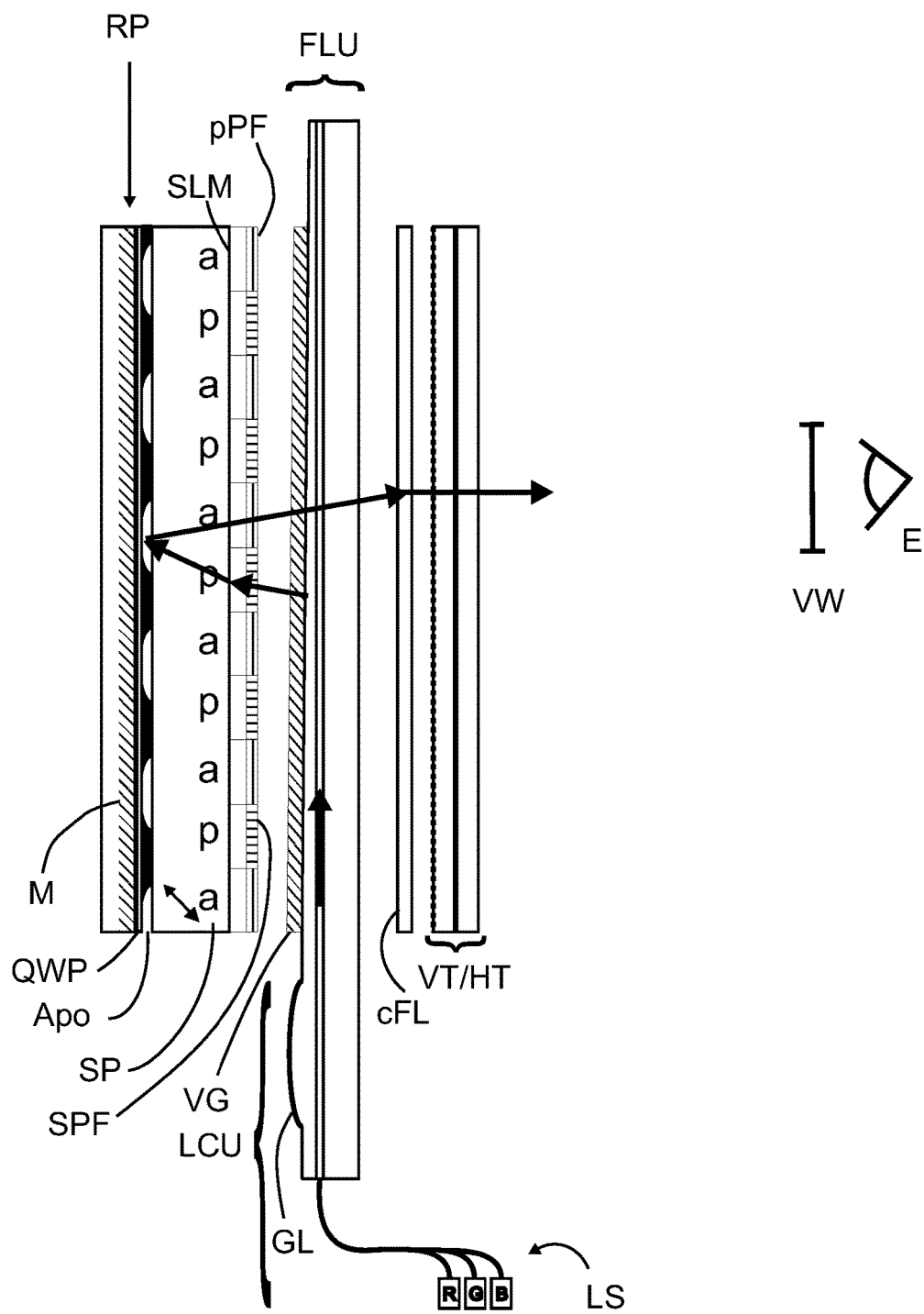
FIG. 7 shows a further embodiment of a reflection type complex-valued spatial light modulator device by using a beam displacing element in the form of a birefringent plate.

A further reflection-type complex-valued spatial light modulator device SLM providing serial combination of phase modulating pixels and amplitude modulating pixels is shown in FIG. 7. In this figure the SLM uses a beam displacing element SP in form of a birefringent plate, preferably a Savart plate. A Savart plate can thus also be used in order to realize the serial combination of adjacent phase modulating pixels and amplitude modulating pixels. A front light illumination unit can provide illuminating light which has an exit angle of e.g. 0° deg or 10° deg to the axis of the surface normal. If an exit angle of 0° deg is used the back reflected light from the reflection plane has to be separated by using a polarization beam splitter geometry which can be realized by a volume grating having e.g. 60° deg diffraction angle. However, an illumination of the SLM at e.g. 10° deg gives the opportunity to use the Savart plate as beam shifter or beam displacing element. The Savart plate is most preferred at 10° deg, where in addition the back reflected light is 20° deg off-Bragg to the geometry of reconstruction of the illuminating light (see volume grating VG in FIG. 7), which is sufficient in terms of angular selectivity of the volume grating for decoupling the light out of the illumination unit.

In order to suppress undesired light and to reduce the crosstalk between neighboured pixels it is preferred to use a patterned polarization filter in front of the adjacent phase modulating pixels and amplitude modulating pixels to be combined as complex-valued pixels. The functional orientation of adjacent polarization filter segments of the polarization filter is orthogonal.

In FIG. 7 the principle of the shown display device is described. A reflection-type complex-valued spatial light modulator device SLM provides serial combination of phase modulating pixels and amplitude modulating pixels which are adjacent to each other and which are placed within the same plane. In contrast to the embodiment shown in FIG. 6, a beam displacing element SP in form of a birefringent plate, here a Savart plate, is used. A slightly off-axis illumination at e.g. 10° deg to the axis of the surface normal is used in order to be off-Bragg at the way back through a volume grating VG which decoupled the light out of a front light illumination unit FLU. The light which passes the phase modulating pixel p is shifted by the birefringent plate SP having an orientation of its optical axis of e.g. 42° deg to 45° deg to the axis of the surface normal. The double arrow drawn at the bottom of the birefringent plate SP marks the orientation of the optical axis of the birefringent plate SP. At the backside of the birefringent plate SP a quarter wave retardation plate QWP is placed which is followed by a mirror plane M. The quarter wave plate QWP and the mirror plane M form the reflection plane RP. The mirror plane M can also carry an apodization profile Apo. The quarter wave retardation plate QWP can be realized by a polymerized liquid crystal (LC) layer which can be orientated by using photo alignment. Photo alignment is advantageous for patterned retarder but not required for a non-structured layer. In other words, it can also be practical to just laminate a quarter wave retardation plate QWP film which is adapted to the design geometry and the wavelengths used onto the mirror plane M. Larger incidence angles at the quarter wave retardation plate QWP require less thickness of the quarter wave retardation plate QWP material. Photo alignment is a standard technology which can be used in order to provide patterned retardation as well as patterned polarization filtering.

The light shifted by the beam displacing element SP which also or alternatively can be realized by using a non-structured volume grating is changed in polarization and reflected back to the SLM plane. Thus, the phase modulated light hits the amplitude modulating pixel a and is modulated in its amplitude. Crosstalk to adjacent phase modulating pixels p is suppressed by introducing orthogonal polarization.

The complex-valued wave field is emitted e.g. at 20° deg off-axis to the illumination geometry of the volume grating VG-based front light illumination unit FLU, that is reasonable off-axis, and thus the wave field propagates into the direction of a field lens FL. For off-axis angle as small as the one shown in FIG. 7 a combined field lens cFL has to be used instead of a single off-axis volume grating VG based lens.

The use of on-axis illumination on the SLM—perpendicular incidence or front light illumination unit FLU at 0° deg illumination angle—in combination with beam shifting which is based on a birefringent plate (Savart plate) has a limitation in regard to the thickness of the birefringent plate. Calcite provides a so-called walk-off angle of slightly above 6° deg and highly birefringent polymerized liquid crystal (LC) can realize a walk-off angle of e.g. 7° deg. This is equivalent to a lateral shift and does not affect the Poynting vector. In other words, the beam hits the quarter wave retardation plate and the mirror plane at 0° deg. The polarization is changed to the orthogonal one by the quarter wave retardation plate and the back reflected light passes the birefringent plate without any lateral displacement. This means that a maximum walk-off angle of 7° deg is provided which results in a minimum thickness of the birefringent plate, which is larger than eight times the pixel pitch. And this is one-way only, that is the half of the entire beam path. It is no shift at the way back from the mirror plane. Thus, the effective distance which is present between the phase modulating pixels and the amplitude modulating pixels is larger than sixteen times the pixel pitch, which is not practical. Due to crosstalk between adjacent pixels, which is introduced by diffraction, the limit of the distance is approximately ten times the pixel pitch, which is present along the coherent direction. In other words, the use of a birefringent plate at 0° deg incidence of the illuminating light does not provide a reasonably short distance between diffracting apertures, and thus does not adequately work here. This is why an additional slightly off-axis illumination can be used.

Figure 8:
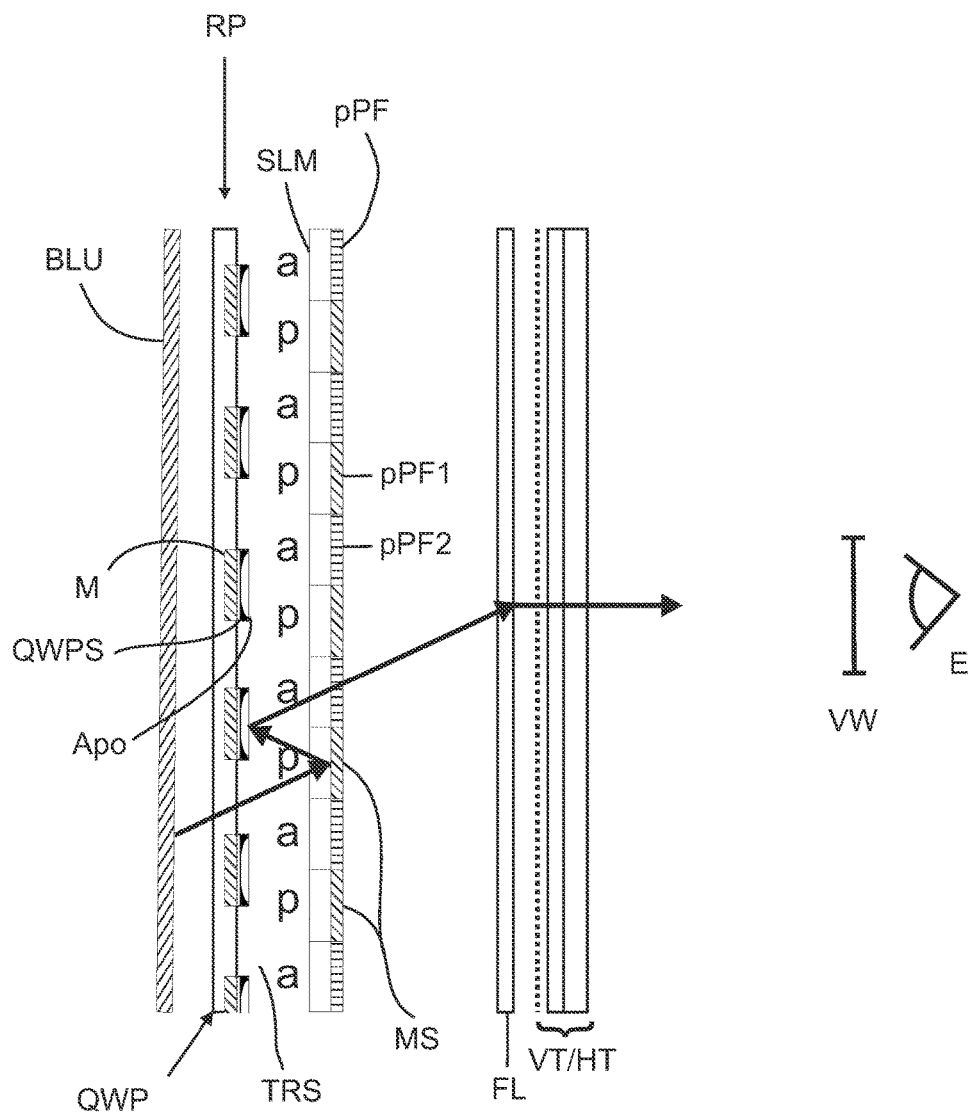
FIG. 8 shows an embodiment of a transmission type complex-valued spatial light modulator device according to the invention.

FIG. 8 describes an alternative embodiment of a display device which works in transmission and which laterally combines adjacent amplitude modulating pixels and phase modulating pixels of a display panel of a spatial light modulator device SLM.

A backlight illumination unit BLU illuminates the SLM arrangement at an angular offset to the normal incidence of 25° deg. The discrete value of the oblique incidence depends on the discrete embodiment of the display device and can be e.g. 10° deg to 45° deg. Preferred values of the oblique incidence are also dependent on the liquid crystal (LC) modes used of the addressable transmissive layer of the SLM, which can be e.g. in-plane or out-of-plane LC modes. A high technological effort would be required in order to use different LC compositions for different subsets of pixels. Thus, the LC mixture which can be used for both types of sub-pixels (amplitude modulating pixels, phase modulating pixels) can rather be the same than different. A patterned photo alignment is not an issue and thus different orientations of alignment layers are practical for different subsets of pixels. In other words, a preferred embodiment uses a single LC composition, which e.g. comprises more than 20 different chemical components, for phase modulating pixels and amplitude modulating pixels, too. However, the alignment of the phase modulating pixels and the amplitude modulating pixels can be different and thus optimized in order to fit the different requirements of the two subsets of pixels used. The same LC composition can be used for different types of operation, that is e.g. for in-plane or out-of-plane operation. Thus, the electrode arrangement which is used for the phase modulating pixels and for the amplitude modulating pixels can be different.

A plane of patterned polarization filter pPF having segments is not required. Polarization filtering segments can be used in order to avoid crosstalk between adjacent pixels. The simplest way (in regard to the shown element pPF) is not to use the plane of polarization filter segments (pPF), where the segments are nested according to the order of the phase modulating pixels and the amplitude modulating pixels.

The next functional step (in regard to the element pPF) is to use polarization filter segments pPF at the exit aperture of the amplitude modulating pixels a only and mirror segments MS at the reflective back end of the phase modulating pixels p. This also means that a non-structured polarization filter plane can be used behind the exit plane of the SLM arrangement. Absorptive polarization filters are preferred in order to provide high contrast of the holographic generated image as e.g. 1000:1.

The third functional step (in regard to the element pPF) is to use a pattern of nested polarization filter segments which provide orthogonal operation. Polarization rotation which is due to the LC mode used has also to be taken into account here.

Finally, the preferred embodiment is to use reflective type polarization filter segments, such as e.g. wire grid polarizer segments, at the reflecting back end of the phase modulating pixels p. Wire grid polarizer segments can be coated with a patterned absorptive film which acts as a black mask for the polarization to be suppressed. Within the preferred embodiment absorptive type polarization filter segments are placed at the exit apertures of the amplitude modulating pixels.

The phase modulating pixels are relied to a mirror, the amplitude modulating pixels comprising a structured polarization filter for suppression of crosstalk.

Referring to FIG. 8 in detail, an illumination unit designed as a backlight illumination unit BLU provides collimated light having an angular spectrum of plane waves (ASPW) of ≤1/60° deg which is present along the coherent direction. The collimated light is emitted by the illumination unit BLU at the defined illumination angle, which is e.g. 25° deg. In addition, the exit polarization of the illumination unit BLU is defined and a high degree of polarization is present. Thus, the SLM shown in FIG. 8 is illuminated at defined conditions.

The light passes then the shown optical elements in a defined order. The light hits the phase modulating pixels p first. At a back end of the phase modulating pixels p introducing a phase shift $\varphi_i$ a reflective element is provided. The providing of a mirror comprising mirror segments MS is sufficient. A structured wire grid polarizer can also be used. The use of mirror segments MS covering the back end of the phase modulating pixels can be sufficient in regard to reduced manufacturing cost versus image contrast obtained. At the exit plane of the SLM the mirror segments MS are placed adjacent to polarization filter segments pPF. The mirror segments MS and the polarization filter segments pPF formed as transmissive polarization filter segments are nested within each other, which are provided by e.g. using alternating arrangement of mirror segments MS and polarization filter segments pPF. In other words, an arrangement of mirror segments is nested within an arrangement of polarization filter segments. The light hitting the phase modulating pixels p is reflected back from the mirror segments, where thus a double path arrangement is realized within the phase modulating pixel p. Thus, the thickness of the addressable transmissive layer, preferably the LC layer, required for a $2\pi$ phase shift, which has to be provided by the phase modulating pixels p, is reduced. To double the thickness of the LC layer means to reduce the switching speed for controlling the pixels of the SLM by a factor of four. This applies for the majority of LC modes and a voltage, which is held constant. The hybrid aligned nematic liquid crystal (HAN LC) mode and alternative in-plane LC modes act different. The reduced thickness of the LC layer provides higher frame rate at a practical voltage. This means that it is not required to increase the voltage significantly. An increased voltage causes significantly technological effort in regard to the implementation of a backplane, which is the electrical circuit providing the electrical control of the display panel of the SLM. Therefore, the double path arrangement within the SLM which is realized for the phase modulating pixels p is very advantageous.

Furthermore, the light passed the phase modulating pixels p twice propagates to a reflection plane RP which provides a pattern of structured reflectors in form of mirror elements M. The reflection plane RP comprises an apodization profile Apo which provides apodization. This apodization profile is formed as segmented amplitude apodization profile and can be, for instance, a Kaiser-Bessel window or a Gauss distribution. The effect of the apodization of the finally obtained complex-valued pixels is to reduce the spatial frequencies which are present within the exit plane of the complex-valued phase and amplitude spatial light modulator SLM and thus to reduce the intensity of the higher diffraction orders of the SLM grid which otherwise can disturb the neighboured eye of a user observing a reconstructed scene through a viewing window VW. The apodization profile can also be provided in front of the phase modulating pixels p or even behind the amplitude modulating pixels a in order to provide the inner pixel intensity distribution which is capable of reducing the intensity of the higher diffraction orders.

The light passed the apodization profile Apo hits a structured retardation element in form of a quarter wave plate QWP comprising quarter wave retardation element segments QWPS which introduces a $\lambda/4$ retardation for a single pass. These segments QWPS of the quarter wave retardation element QWP are placed on top of the mirror elements M, which generate a segmented mirror plane. The light is then reflected back and the quarter wave retardation element QWP is passed again. Thus, a polarization state is generated which is orthogonal to the entrance polarization. This means e.g. TM (transversal magnetic) polarized instead of TE (transversal electric) polarized or LCP (left circularly polarized) polarized instead of RCP (right circularly polarized) polarized. This change of the polarization is used in order to finally reduce the crosstalk of adjacent pixels which finally results in an increased image contrast. It can also be used in order to provide the entrance polarization which is required for the amplitude modulating pixels a, which will follow within the optical path later on.

The light which is reflected back by the mirror elements M to the forward direction hits the amplitude modulating pixels a. At the exit plane of the amplitude modulating pixels a a patterned polarization filter pPF is placed. The patterned polarization filter pPF regarding the amplitude modulating pixels is a plane of patterned polarization filter segments pPF2 which are the second polarization filter segments seen in the propagation of light which passes through the SLM. At the amplitude modulation pixels a absorption type polarization filter segments are preferred, which are orientated orthogonal to the other group of nested patterned polarization filter segments pPF1, which are related to the phase modulating pixels and which are used at the reflective back end of the phase modulating pixels p. These patterned polarization filter segments ppPF1 are the first one seen in the propagation of light on the way through the SLM. E.g. a patterned wire grid polarizer can be used. Alternatively, an absorptive type polarization filter segment, which is placed in front of the mirror segment MS, can also provide polarization selective reflection required at the back end of the phase modulating pixels p. However, compared to a patterned wire grid polarizer an increased absorption will be present.

This patterned polarization filter pPF provides the suppression of crosstalk of adjacent pixels. An absorption-type patterned polarization filter (pPF) is preferred regarding the amplitude modulating pixels a as discussed above. The patterned polarization filter pPF can also be placed at the entrance plane of the amplitude modulating pixels a.

After passing the phase and amplitude spatial light modulator SLM the light propagates to a field lens FL which is, for instance, a volume grating or a stack of volume gratings. The field lens FL focuses the wave field which contains all wave field segments of three-dimensional object points to be reconstructed onto a focal plane, which can be equivalent to the mean average user distance. After passing the field lens FL a vertical diffraction or vertical tracking is introduced by e.g. using a vertical tracking unit VT comprising an in-plane liquid crystal (LC) grating with individually controlled electrode lines. A horizontal tracking unit HT comprising an in-plane LC grating can be used in order to provide horizontal tracking.

The discrete embodiment of this alternative of the invention shown in FIG. 8 can be an object to change. For example, the oblique angle of incidence onto the SLM can be modified. A modified oblique entrance angle results in a modified thickness of a transparent substrate TRS, which is used between the phase and amplitude spatial light modulator plane and the reflection plane RP carrying the structured mirror plane, which is placed between the backlight unit BLU and the phase and amplitude spatial light modulator plane. A thin glass foil can be used as transparent substrate TRS. There are already several glass foils at rolls with e.g. 100 µm, 75 µm, 50 µm or even with 25 µm thickness. It is important to limit the path length which is present between the first patterned structure in the reflection plane RP adding diffraction and the last patterned structure at the exit plane of the SLM to 10 times the pixel pitch used. This applies for the coherent direction of the light that is for two directions in case of using a two-dimensional (2D) encoding of sub-holograms in the SLM. This defines practical geometries. More exact, the path length from the plane of the first array-type apertures, which is the plane in front of the phase and amplitude spatial light modulator SLM, and the exit plane, which is the plane of the phase and amplitude spatial light modulator SLM, has to be limited preferable to 10 times the pixel pitch used. This means to 125 µm for 12.5 µm pixels pitch (e.g. mobile holographic tablet display), to 250 µm for 25 µm pixel pitch (e.g. holographic desktop application) and to 0.8 mm for 80 µm pixel pitch (e.g. holographic TV application). The apodization structure can also be placed at the entrance plane, i.e. in front of the phase modulating pixels p. It is optional to use several apodization planes within the SLM structure which can be used e.g. in order to widen the 10 times pixel pitch limit of the optical path used for the combination.

Figure 9:
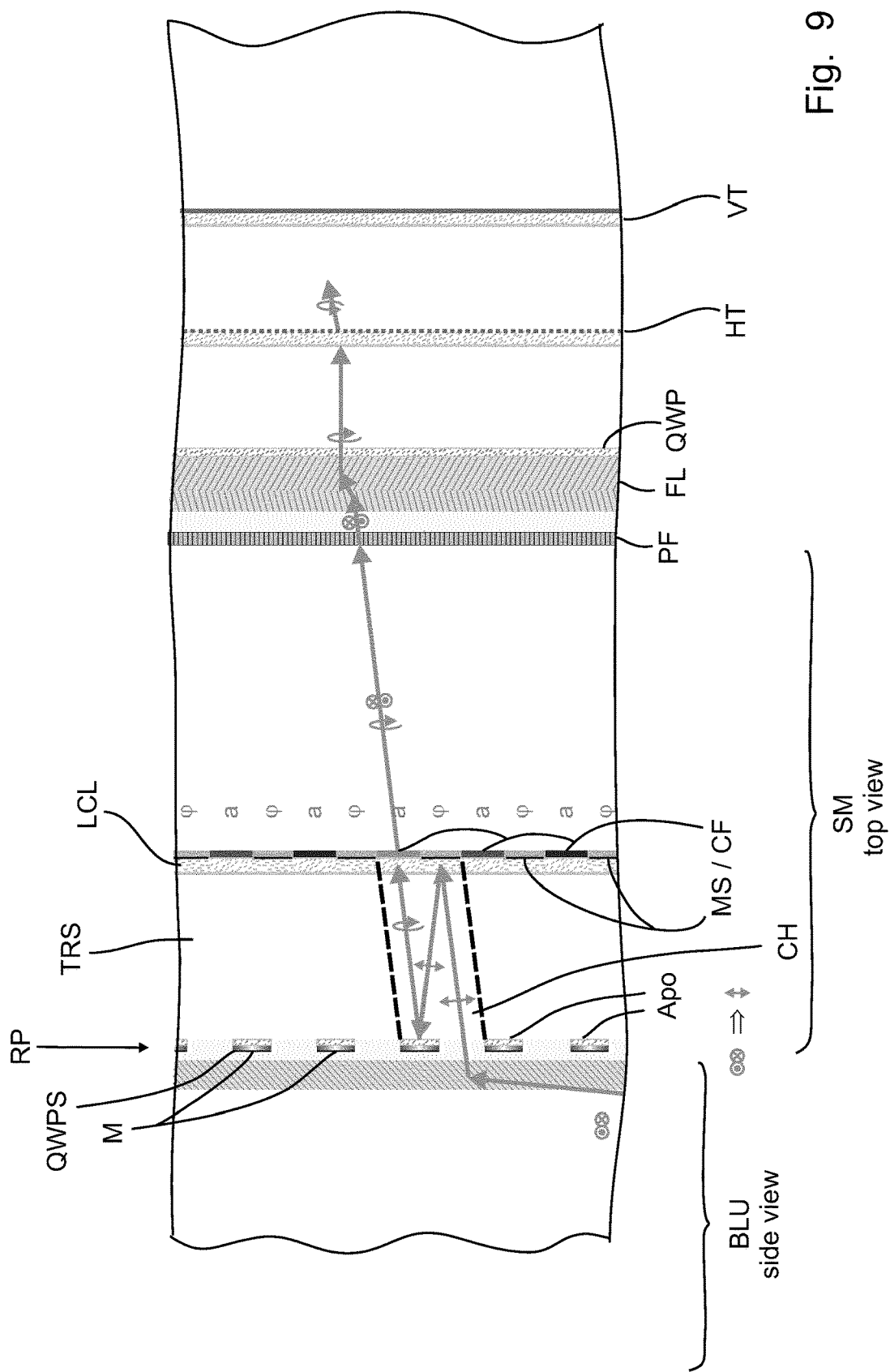
FIG. 9 shows the embodiment of the transmission type complex-valued spatial light modulator device of FIG. 8 in detail.

In FIG. 9 a preferred embodiment of the display device according to the invention is described. This display device can be used with the ECB (electrically controlled birefringence) mode of liquid crystals (LC). As addressable transparent layer LCL having the complex-valued pixels a liquid crystal (LC) layer is used. Due to the required modulation of the refractive index of the LC layer LCL it is preferred to use TE polarized light for large diffraction angles of Braggdiffraction-based volume gratings. The polarization state of the light can be changed as required for the discrete embodiment by e.g. changing the orientation of an illumination unit, here in form of a backlight illumination unit BLU or by adding an additional achromatic retarder plane, which can be placed between the backlight illumination unit BLU and the entrance plane of the spatial light modulator SLM. For instance, an illumination unit emitting TE (transverse electric) polarized light can be rotated in terms of the optical design implemented by 90° deg in order to illuminate the SLM with TM (transverse magnetic) polarized light instead of TE polarized light. Thus, e.g. TE, TM CLP or CRP light can be provided as required for the discrete embodiment. Achromatic retarders can be generated cost efficient by e.g. using polymerized LC compounds. The backlight illumination unit BLU (side view) shown is rotated about 90° deg in regards to the SLM (top view) for a better understanding.

As it can be seen in FIG. 9, linear polarized light which is TM polarized here (here the top view instead of the side view) enters the SLM which is a sandwich composed of the LC layer LCL and a reflection plane RP, which is provided behind the backlight illumination unit BLU and which forms the entrance plane of the SLM. Between the LC layer LCL and the reflection plane RP a transmissive substrate TRS is provided as spacer. In the case of using the ECB mode in the LC layer LCL the phase modulating pixel p changes the phase without changing the polarization state. This is due to the orientation of the liquid crystals in the LC layer LCL. The optical axis of the phase modulating pixel p is in the plane of the electrical field of the TE polarized light.

The light reflected back from the phase modulating pixel p by mirror segments MS at the back end of the phase modulating pixel p is directed backwards to the backlight illumination unit BLU and hits the reflection plane RP as a structured plane, which comprises reflecting segments M, apodization profile segments Apo and quarter wave element segments QWPS introducing a retardation which is $2\times\pi/4=\pi/2$ ($2\times\lambda/8=\lambda/4$). Thus, circular polarized light is obtained which can be e.g. LCP light or RCP light.

The mirror segments MS at the back end of the phase modulating pixels p and the mirror elements M of the entrance plane of the SLM or of the reflection plane RP can be e.g. made by using metal or dielectric mirror stacks or even a combination thereof. Chromium (Cr) or aluminium (Al) can be used as metal electrodes, which is already well-known.

The light reflected back from the reflection plane RP, which is the entrance plane of the SLM, too, can be formed on demand and thus can have a TE, TM, LCP or RCP polarisation state depending on the LC and the LC mode used.

As shown in FIG. 9, the amplitude modulating pixels a are illuminated with circular polarized light which is e.g. RCP light or LCP light. The amplitude modulating pixels a, which work in ECB mode here, change the polarization state by introducing a controllable retardation. Thus e.g. LCP light can be changed to TE light. The amplitude modulating pixels a use transparent ITO (tin-doped indium oxide) electrodes. A plurality of LC modes can be used as e.g. TN (twisted nematic) or in-plane rotating LC modes which realize LC in-plane rotation e.g. at the side of the LC layer, as e.g. the HAN mode or LC modes, which realize LC in-plane rotation in the middle of the LC layer.

A polarization filter PF provided behind the complex-valued pixels and which is e.g. an absorptive type wire grid polarizer blocks the non-TE polarized part of the light and thus transforms the retardation of the amplitude modulation pixel a as the second controlled pixel to a real amplitude modulation. The polarization of the entrance plane of the SLM can be adapted by using an achromatic or apochromatic retarder layer which can be attached to the exit plane of the backlight illumination unit BLU. A further, e.g. achromatic or apochromatic, retarder layer/quarter wave plate QWP is provided later on in the beam path in order to provide the right polarization state for e.g. polarization type LC gratings used for angular fine tracking by means of the vertical tracking unit VT and/or the horizontal tracking unit HT.

The pixel plane can comprise colour filters CF for RGB, which e.g. can be used for a one-dimensionally encoded vertical-parallax TV display device. In FIG. 9 the amplitude modulating pixels a are provided with the colour filters CF. For a two-dimensionally encoded display device time-multiplexing can be used without using patterned colour filters CF.

Patterned polarization filter/analyzers formed as checkerboard pattern or strip-shaped pattern are provided at least for one channel for preventing crosstalk between adjacent pixels. Additionally, the entrance channels CH, where a channel CH corresponds to the beam path of a complex-valued pixel and is shown in FIG. 9 in a dotted line because it is a virtual channel, can also be equipped with patterned analyzers which provide transmission for orthogonal polarized light. Thus, the signal to noise ratio can be increased. The term channel is used in regard to the optical function, which means that the light passes the SLM along separated channels, which are related to the complex value providing combination of phase modulating pixels p and amplitude modulating pixels a.

Figure 10:
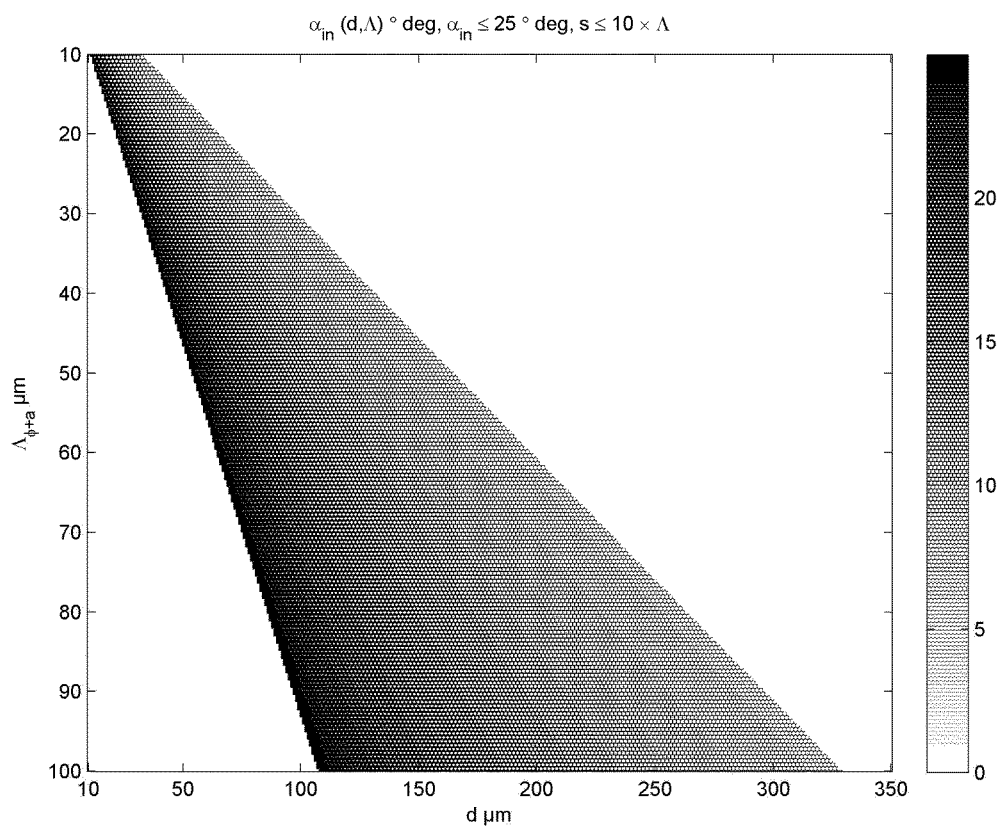
FIG. 10 shows an illumination angle in dependence on the thickness of the transparent plate, which is used between the plane of phase modulating pixels and amplitude modulating pixels and an entrance plane of the spatial light modulator device and in dependence on the pitch of the complex-valued pixel.
Figure 11:
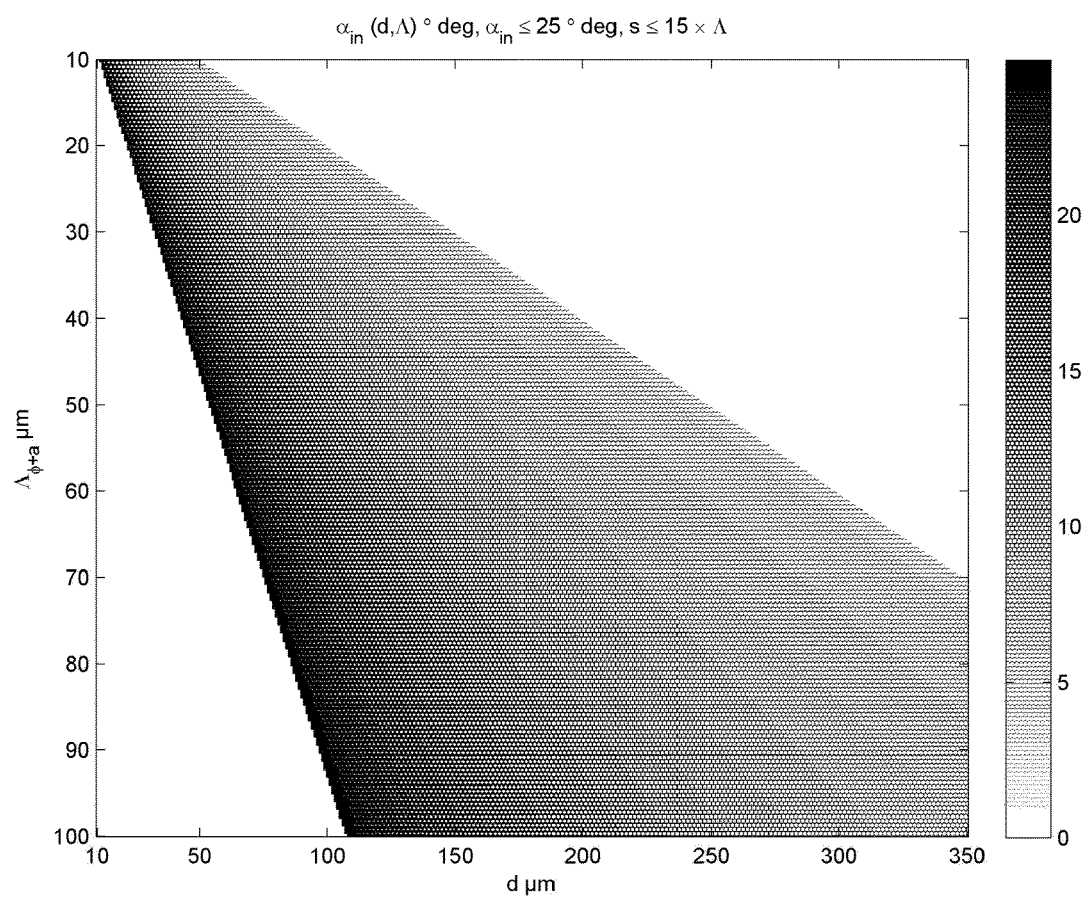
FIG. 11 shows an illumination angle in dependence on the thickness of the transparent plate, which is used between the plane of phase modulating pixels and amplitude modulating pixels and an entrance plane of the spatial light modulator device and in dependence on the pitch of the complex-valued pixel, where an extended limit of the practical inner SLM propagation distance, which is up to 15× the pitch of the complex-valued pixel.

The following section describes the propagation distance of the light within the SLM with reference to the FIGS. 10 and 11. The propagation distance of the light which is present within the SLM has to be limited in order to keep the amount of pixel crosstalk as low as required which means e.g. that low that an image contrast of >1:100 or even >1:1000 can be obtained.

FIG. 10 shows the practical range of the thickness d of the transparent substrate used between the plane of the phase modulating pixels and the amplitude modulating pixels and the entrance plane of the SLM comprising mirror segments, which can be provided with additional apodization profiles. The range of the thickness d depends on the pitch of the complex-valued pixel $\Lambda_{\varphi+a}$. For a two-dimensional (2D) encoding of the SLM the smallest pitch has to be used to define the maximum thickness d. The angular range used for the illumination of the SLM is limited to 25° deg which is acceptable for several LC modes and e.g. for the ECB mode. Thus, the lower left part of the diagram of FIG. 10 is cut away in order to mark this range as not practical because the angular range is greater than 25° deg. This part is shown in white. The further part cut away on the right hand side of the diagram is defined by propagation distances which exceed the limit 10× pitch of the complex-valued pixel $\Lambda_{\varphi+a}$. This limit of 10 times pixel pitch is a result of simulations taking the optical near field into account.

Diffraction taking place at an entrance plane of the SLM will cause inter-pixel crosstalk within a pixel plane of the SLM which is placed behind the entrance plane. The larger the wave length used and the smaller the pixel aperture the larger the crosstalk which is present within the pixel plane. Thus, the propagation distance which can be introduced between the two structured planes mentioned above has to be limited. Simulations resulted in a limit of 10 times pixel pitch. This is why values of the pixel pitch which are larger than this value are cut away within FIG. 10.

For the simulations mentioned above polarization management was not taken into account. However, due to polarization management, diffraction at the entrance plane of the SLM introducing crosstalk is blocked out later on in the display device. Thus, the crosstalk which can be present between adjacent pixels is reduced. This means that larger thickness range can be used due to polarization management.

This defines the difference between FIG. 10 and FIG. 11. As shown in FIG. 11, the angular range used for the illumination of the SLM is also limited to 25° deg which is acceptable for several LC modes. Thus, the lower left part of the diagram of FIG. 11 is cut away, too. This defines the non-practical range in regard to the entrance angle of the light coming from the illumination unit and incident on the SLM. The further part cut away on the right hand side of the diagram is defined by propagation distances which exceed the limit 15× pitch of the complex-valued pixel $\Lambda_{\varphi+a}$.

Thus, it is advantageous that the transparent substrate thickness d or a cover substrate/glass thickness d can be increased due to polarization management.

Lateral shifts of single wave segments due to thickness variations of a cover glass provided on top of the addressable transmissive layer, seen in the propagation of light, and comprising the mirror segments of the entrance plane of the SLM are less critical if an increased thickness d can be used. This is due to the relation of thickness d and thickness tolerance $\Delta d$ ($d/\Delta d$). For instance, to realize a total thickness variation of ±2 μm for 100 μm substrate thickness is less expensive, in terms of production costs, than realizing a total thickness variation of ±1 μm for 50 μm substrate thickness.

As shown in FIGS. 10 and 11 LC modes are preferred which can be used in a way to get a reduced number of components. Thus, one option is e.g. to avoid the structured retardation used within the entrance plane of the transmissive type complex-valued in-plane SLM. This also means that a change of the state of polarization, which can be introduced by a phase shifting or a pixel used to rather change the phase in a controllable way, can be compensated by the second, amplitude modulating pixel used to modulate the amplitude finally which means e.g. together with a polarization filter used later on in the beam path behind the SLM.

This means that the complex-valued modulation preferable done by using a phase shift $\varphi$ which do not change the amplitude a or which do not change the polarization state can also be realized otherwise by using pixels providing complex-valued modulation as a combination of a phase shift and a change of the state of polarization, which finally results in a modulation of the amplitude.

The advantageous way to provide a complex value c is $c=a\times e^{i\varphi}$, where a is the amplitude and $\varphi$ is the phase. This means to use a first, phase modulating pixel which does not change the amplitude value and a second, amplitude modulating pixel which does not change the phase value. In this situation, amplitude values have to be transferred to amplitude modulating pixels and phase values to phase modulating pixels.

Alternatively, it is also possible to use pixel embodiments and related LC modes which realize the complex value as a combination only. This means that e.g. the state of both pixels has to be changed in order to change e.g. only the amplitude or e.g. only the phase of the exit plane of the complex-valued pixel. In this situation, amplitude values and phase values can be transferred to a look-up table (LUT) in order to obtain the electrical control signals which have to be transferred to the two pixels finally forming the complex-valued pixel.

Figure 12A:
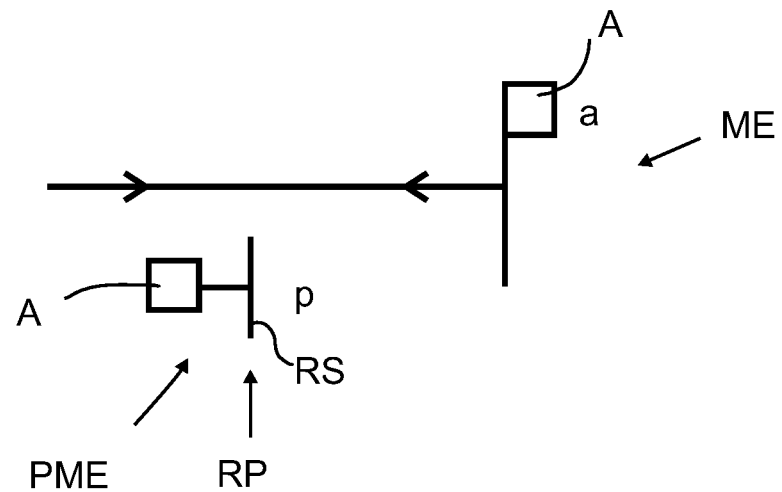
FIG. 12a,12b show an embodiment of a reflection type complex-valued spatial light modulator device based on MEMS.
Figure 12B:
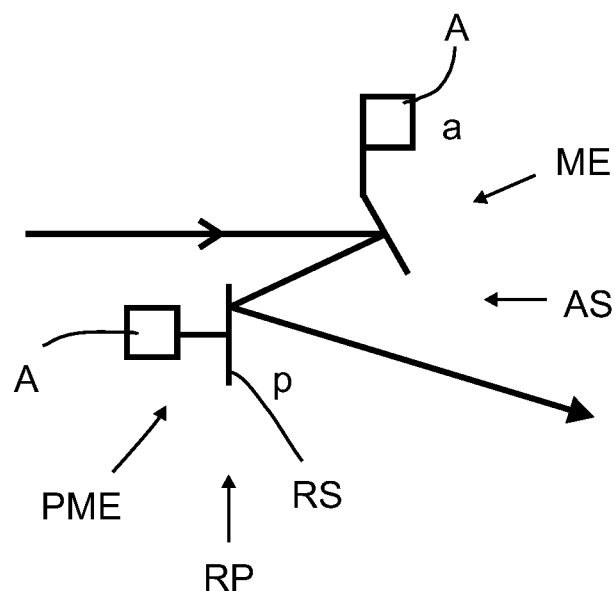

In the FIGS. 12a and 12b an embodiment is described which uses an alternative SLM configuration to laterally combine phase modulating pixels and amplitude modulating pixels within a display panel. The phase modulating pixels and the amplitude modulating pixels are however not provided in the same plane but are arranged in a lateral way and form complex-valued pixels of a so formed complex-valued MEMS (micro-electro-mechanical-system)-based SLM. This MEMS-based SLM comprises a MEMS array having multiple mirror elements slightly displaced to each other. A phase modulating pixel p is realized by using a piston mirror element PME having a reflection plane RP comprising a reflection surface RS and an actuator A for moving the piston mirror element PME in the direction as shown by the arrow in FIG. 12b. The amplitude modulating pixel a is realized by using a mirror element ME which is fixed and can be controlled by an actuator A. The mirror element ME has a reflection surface RS which faces towards the reflection surface RS of the piston mirror element PME. Further, by controlling the mirror element ME and thus the reflection surface RS by the actuator A the reflection surface RS can be altered in its form so that incident light can be directed to a predetermined direction. Thereby, the reflection surface can be altered from a sufficiently plane surface in the OFF state as shown in FIG. 12a to a curved plane, e.g. convex or concave plane, or a plane formed under an angle in the ON state as shown in FIG. 12b. The piston mirror element PME and the mirror element ME are only shown in a simplified way.

FIG. 12a shows the complex-valued pixel in an OFF state, where in FIG. 12b the complex-valued pixel is shown in an ON state. In the OFF state the light is directed first to the amplitude modulating pixel a in form of the mirror element ME. Since in the OFF state the mirror element ME is not controlled by the actuator A, the incident light is reflected back towards its incidence direction as shown by the double arrow in FIG. 12a. In the ON state the mirror element ME is controlled by applying a voltage to the actuator A, where the reflection surface RS is altered in such a way that the light incident on the mirror element ME is modulated in its intensity and is then directed to the piston mirror element PME for modulating the phase of the light. The in phase and in amplitude modulated light is then directed e.g. to a field lens (not shown in FIG. 12b) as e.g. shown in FIG. 8 or 9 for focusing the light to a user space.

FIGS. 12a and 12b show a generic embodiment only. The piston-type mirror PME can be used for direct and straight forward implementation of phase modulation. The mirror element ME providing a tilt gives a rather indirect modulation of the amplitude by tilting a wave segment away from an aperture stop AS following later on in the beam path as shown in FIG. 12b. This aperture stop AS, which can stop light from further propagation into the user space, can be formed by an array of exit aperture stops of the SLM. In the case of the presence of non-symmetric intensity distribution of the exit aperture stops of the complex-valued pixels provided by the SLM a correction can be taken into account during the process of hologram encoding.

Figure 13:
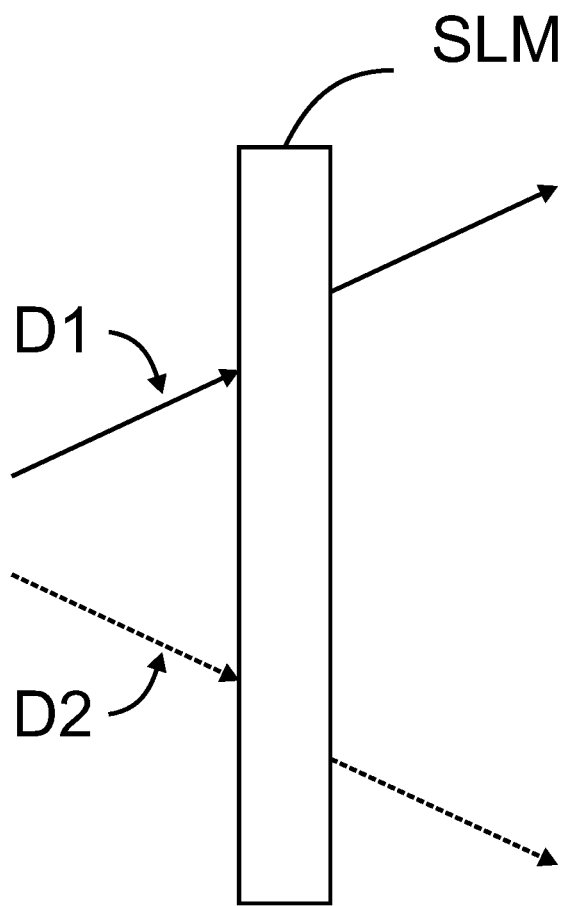
FIG. 13 shows an embodiment of a display device according to the invention, where an illumination of a spatial light modulator device along different controllable directions is provided.

In FIG. 13 a further embodiment of the inventive display device is shown. In this embodiment an SLM combining phase modulating pixels and amplitude modulating pixels is illuminated along different individual controllable directions. This means to illuminate the SLM e.g. along two or four different entrance angles which can be switched ON or OFF on demand. This is shown in FIG. 13 in a generic way.

The SLM, here only shown in a simplified way, is arranged in order to provide complex-valued modulation if illuminated along several discrete directions. FIG. 13 shows an SLM which is illuminated at two directions, D1 and D2. The SLM can be e.g. an SLM as described in the FIGS. 6, 7, 8 and 9. An illumination unit, not shown here, provides different exit angles of the light illuminating the SLM. This light is controlled by switching ON or OFF different lights sources or illumination directions within the illumination unit, e.g. a wedge-type-based backlight illumination unit.

Behind the SLM multiplexed volume gratings can be provided comprising different field lens functions. This can be e.g. a field lens function 1 and a field lens function 2. Field lens function 1 can have a lateral offset of the focal point of +10° deg and the second field lens function 2 can have a lateral offset of the focal point of −10° deg. Thus, the tracking range can be increased by this coarse tracking. Thus, the light exit angles of the SLM are adapted to several discrete field lens geometries.

Figure 14:
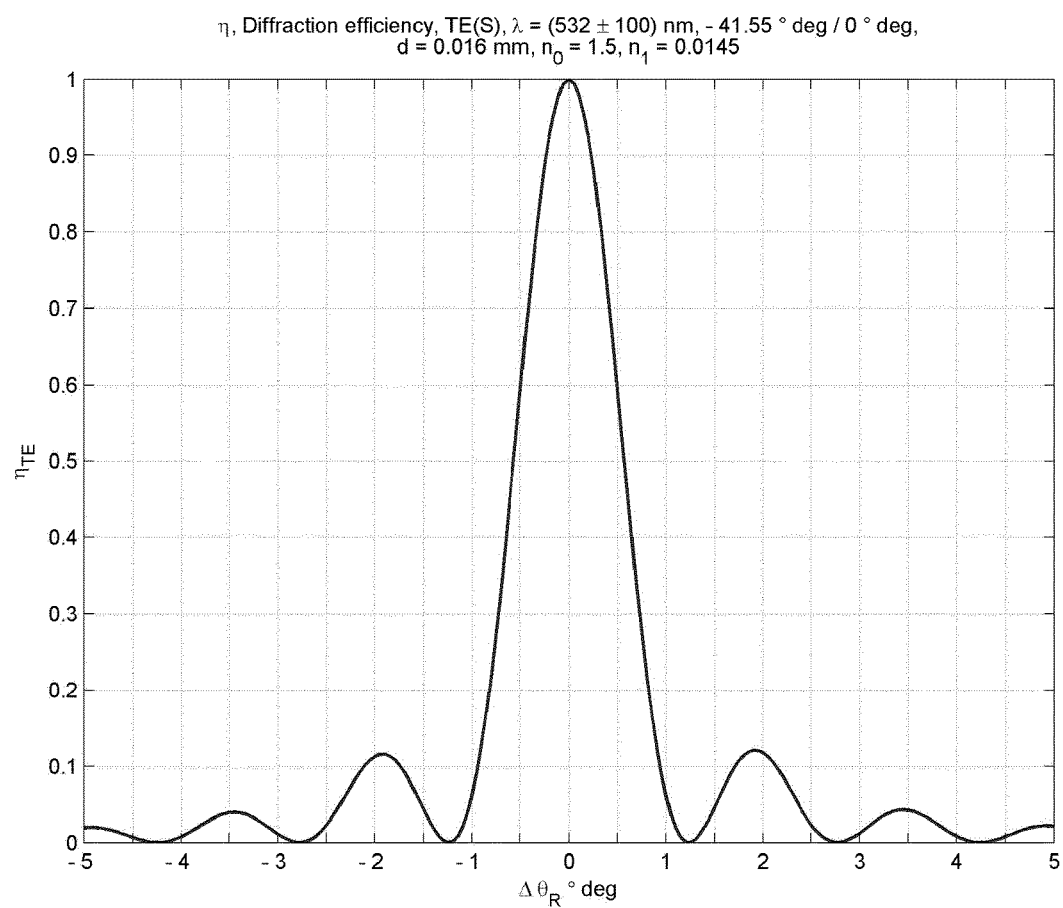
FIG. 14 shows a graph of the diffraction efficiency of a Bragg diffraction-based volume grating, which realizes a geometry of diffraction of 84.26° deg air/0° deg PMMA, which is −41.55° deg/0° deg within a medium, which has a mean value of the refractive index of $n_O=1.5$, at a thickness of the holographic recording film (HRF) of d=16 μm, in dependence on the difference to the designed Bragg angle, which is the design incidence angle of the grating.

FIG. 14 is referred to the angular spectrum of plane waves, where here only an example is described. The graph of FIG. 14 shows a diffraction efficiency of a Bragg diffraction-based volume grating, which realizes a geometry of diffraction of 84.26° deg in air/0° deg in PMMA, which is −41.55° deg/0° deg within a medium having a mean value of the refractive index of n0=1.5, in dependence on the difference to the designed Bragg angle, which is the design incidence angle of the grating. The thickness of the volume grating used is $d_{HOE}=16$ μm.

The angular spectrum of plane waves, which is up to $\frac{1}{60}°$ deg, can be used along the coherent direction of the illumination (in a holographic display device) in order to provide high definition viewing (HD) up to a distance out of the display device which is half the distance to the users eye.

If the working principles of tracking viewing window-based holographic three-dimensional (3D) display devices is understood it can be recognized, that this also means to use an extended light source instead of a point light source and to not require optical mono-mode fibres. As a consequence, laser light sources can be used having a so-called beam quality factor $M^2$, which is significant larger than 1. To use a point source, which would add a high degree of the absolute value of the mutual coherence $|\mu_{12}|$, makes no sense within this application described herein.

The incoherent direction in the display device can use e.g. 0.5° deg up to 1° deg in order to span a sweet spot. Ten times beam stretching can be provided for instance by volume gratings which are based on Bragg diffraction. In addition, surface relief gratings or polarization gratings can be used for this. The angular spectrum of plane waves has to be provided as incoherent superposition of plane waves. This is what an angular spectrum of plane waves physically is. And this means that curvatures of wave fronts or wave segments are not problematic here.

The advantage is here that the angular spectrum of plane waves can be provided as a combination of a dynamic scatter along at least one direction and a static expanding scatter along at least one direction. However, the angular spectrum of plane waves cannot be provided as a static scatter function only. This would not make any sense here.

The volume gratings which e.g. provide 10× beam stretching within the (backlight) illumination unit can have an angular acceptance which is smaller than required. This means for a one-dimensional encoding the angular acceptance should be <$\frac{1}{60}°$ deg for the coherent direction and for the incoherent direction <0.5° deg to 1° deg. In this case the primary illumination can provide the angular spectrum of plane waves which is accepted by the volume gratings. For example, with reference to FIG. 14 a volume grating with a thickness of $d_{HOE}=16$ μm which realizes a geometry of −84.26° deg in air to 0° deg in PMMA, which is 41.554° deg/0° deg in PMMA, diffracts ±0.2° deg (in PMMA) with a diffraction efficiency of η≥0.9. In air this range of (41.554±0.2)° deg (PMMA) is transferred to (82.33 to 87.31)° deg (air). This range can be refracted with low loss by using a dielectric anti-reflection stack which means that this angular range can be refracted to ≥90%. Thus, the angular spectrum of plane waves of ±0.2° deg which is present behind the SLM can be transferred with an efficiency of >0.81 (1 is equivalent to 100%). At 3 m viewing distance this angular spectrum of plane waves of ±0.2° deg provides a sweet spot of ±9.42 mm which is 18.85 mm in total and much larger than required.

The entrance pupil of the human eye has a diameter of 2 mm to 3.5 mm. This has to be taken into account in particular for TV applications. The x-y-z-resolution of a tracking unit of a simulated display device is approximately ±1 mm. This means for a TV application an angular spectrum of plane waves of even less than ±0.1° deg is sufficient.

However, large screens, e.g. for TV, and reduced viewing distances can require an increased angular spectrum of plane waves which spans the sweet spot. In this case the dynamic part of the angular spectrum of plane waves which is e.g. ±0.2° deg or ±0.1° deg can be increased by adding a further static or dynamic one-dimensional (1D) scatter function adding for instance further ±0.2° deg.

A pure one-dimensional static scattering can make no sense regarding the described embodiments. However, in combination with a basic dynamical part it can make sense in some cases. In other words, an angular spectrum of plane waves of ±0.4° deg can be generated by using a first, basic dynamical part of ±0.2° deg, which is widened by using a second or secondary static diffraction based part.

However, a wedge illumination unit, as e.g. shown within FIG. 4, can be slightly modified in order to provide an increased angular spectrum of plane waves of e.g. ±0.4° deg even without the use of a static diffraction element or even dynamic scatter element. The first small striped volume grating (VG1 in FIG. 4) can be changed in order to work at a reduced beam stretching factor which is e.g. 7× only. Thus, a wider angular spectrum of plane waves which fulfils the requirements of a one-dimensional sub-hologram encoding, meaning e.g. to be used in TV display devices, can be transferred through the first Bragg diffraction-based volume grating VG1. The second volume grating VG2 (VG2 in FIG. 4) still can work at 10× or 20× beam stretching. For this example a one-dimensional (1D) sub-hologram encoding of the SLM along the vertical display direction is provided.

In the following an illumination unit for an in-plane complex-valued spatial light modulator SLM is described.

State of the art SLMs which are used in birefringence-based change of the state of polarization are capable of working with an angular spectrum of plane waves which significant exceeds a range of ±10° deg without losing the high image contrast of e.g. 10000:1. In other words, exact amplitude values can be obtained even if broadened angular spectrum of plane waves is present.

To obtain exact phase values a reasonable small angular spectrum of plane waves, e.g. $\frac{1}{60}°$ deg, has to be used. As long the angular spectrum of plane waves propagating within the user space is less or equal to $\frac{1}{60}°$ deg (±$\frac{1}{120}°$ deg)

the wave field can be used to generate three-dimensional (3D) holographic images which fulfil the high definition standard (HD).

A preferred illumination unit, in particular a backlight illumination unit, is described with reference to FIG. 15.

The beam stretching factor of a backlight illumination unit is M (used for magnification of optical systems) or M_x and M_y and defines the change of the angular spectrum of plane waves which is the reciprocal value of the beam stretching factor. Thus, a backlight illumination unit which has to provide an angular spectrum of plane waves at its exit plane of $\leq \pm \frac{1}{120}°$ deg and a beam stretching factor of M_x=M_y=10 can be illuminated with an angular spectrum of plane waves of $\leq \pm \frac{1}{12}°$ deg.

This applies for the coherent direction of encoding which can be e.g. the vertical direction for vertical parallax only or the horizontal and the vertical direction if a two-dimensional encoding is used. The incoherent direction can work with a much wider angular spectrum of plane waves spanning the sweet spot required which is e.g. ±0.35° deg or even a smaller value of e.g. ±(0.1-0.2)° deg a for TV applications.

It is advantageous to avoid the usage of polarization maintaining mono-mode fibres and beam shape parameters, which are also referred to as beam quality factors, $M^2$ close to 1. The symbol for defining the beam quality is $M^2$. A value close to 1 represents a beam which is close to a Gauss beam defining the theoretical optimum, $M^2=1$. To couple light into a mono-mode fibre in a sufficient way a $M^2$ close to 1 is required. This is due to the fact that light which do not propagate within a TE00-Gauss mode will be not guided within a mono-mode fibre. An increased beam parameter product $M^2$ results in a decreased coupling efficiency.

By using of an extended light source, beam parameters of $M^2>1.2$ are practical. An extended light source can be used which is monochromatic and which shows dynamic randomized phase modulation present within the area of the light source. A practical embodiment is a moved scatter plane providing a dynamic and randomized phase modulation and the forming of an adapted intensity distribution which is for instance used to illuminate the collimating unit and finally the entire spatial light modulator SLM plane.

Figure 15:
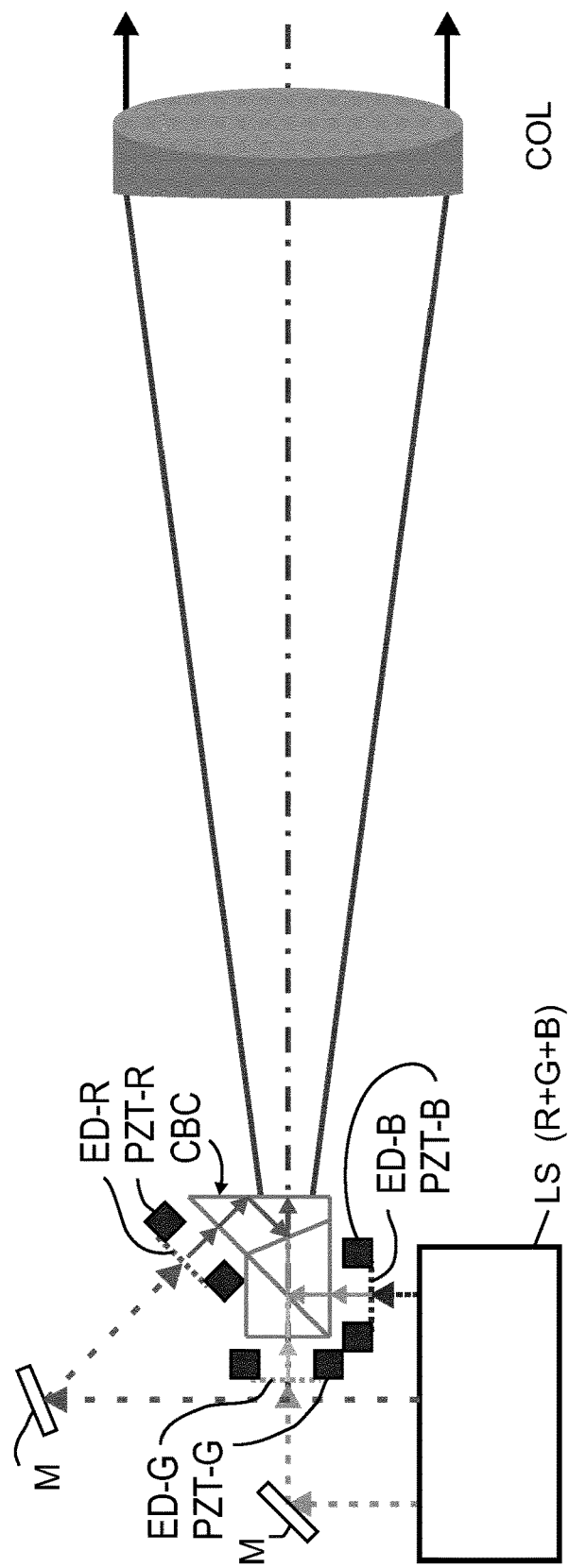
FIG. 15 shows a generic setup of a compact setup of collimation unit of the illumination unit.

FIG. 15 shows a setup of a compact setup of a collimation unit capable of being used within holographic one-dimensional (1D) or two-dimensional (2D) encoded three-dimensional (3D) displays.

The primary colours RGB (red, green, blue) can be provided by a light source LS as a light source having compact laser modules which realize e.g. 1 W optical power within a few cm$^2$. Within this description a holographic display is provided which images a light source into a plane of the entrance pupil of a human eye. For a two-dimensional (2D) encoding a round shape of the initial beams is preferred which has a diameter e.g. within the range of 0.5 mm to 2 mm.

A polarization filter/analyzer can be provided e.g. behind a collimating lens COL of the illumination module/light source LS. An absorptive type wire grid polarizer as polarization filter is preferred. Absorptive wire grid polarizers are realized by applying an additional oxidation process to standard wire grid polarizers. Laser modules, which realize a polarization ration of TE/TM>1000:1 are available standard components. A polarization filter is not a required component.

Reflection elements M as mirrors are used in order to direct the primary beams RGB onto controlled phase randomizing elements formed as engineered diffusers ED-R, ED-G and ED-B which are optimized for the related colour and for a discrete beam diameter. The engineered diffusers ED-R, ED-G and ED-B are on three planes acting as light source planes in the sense of being finally imaged onto the plane of the entrance pupil of the human eye. The phase profiles of the engineered diffusers ED-R, ED-G and ED-B generate a flat top intensity distribution at the focal lengths of the collimating lens COL. Thus, the collimating lens COL is illuminated with a homogeneous light intensity distribution. By using of three optimized engineered diffusers ED-R, ED-G and ED-B an optimized result can be obtained for each colour RGB in a separated way.

By using the engineered diffusers ED-R, ED-G and ED-B a plurality of different phase values can be provided at a spatial randomized distribution. A reasonably fast dynamic phase randomization is thus provided. That is, for every frame a plurality of different randomized phase distributions are used. A master having e.g. 16 different phase levels can be copied by using a UV-curable adhesive. This is a low cost standard process.

Binary phase plates can also alternatively be used as phase randomizing elements or engineered diffusers ED-R, ED-G and ED-B using a spatial randomized shape to provide the flat top beam shaping in a dynamic moved mode. These types of engineered diffusers are available standard components. Several companies offer customized functionality which means tailoring the parameter to the discrete requirements and thus to get the optimized intensity distribution without losing a significant amount of the optical power.

A more advanced phase randomizing element can be realized by using Bragg diffraction-based volume grating films or a single multiplexed Bragg diffraction-based volume grating film providing three geometries. This phase randomizing element can be realized e.g. as a reflective hologram or as a transmissive hologram which works e.g. at an incidence angle of (30 or 45)° deg and a normal exit angle. A multiplexed grating enables optimization for each colour in an individually separated way and a one foil only setup (Bragg volume grating in a single foil) which can work with a single PZT (piezo) element.

Foil moving PZT element comprising frames are used in commercial cameras in order to provide dust removing in front of a CCD or CMOS imaging chip by applying a vibration if switched on. Structure sizes of >10 µm can be used which means that a lateral dynamic movement within the sub 0.5 mm range can be sufficient for an engineered diffuser/dynamic phase randomizing element. By using of two PZT elements with a phase offset rotational movements and Lissajous figures can be realized.

The reflection elements M or mirrors of FIG. 15 used for the adjustment provide small angular offsets in regard to the optical axis of the collimation unit. This can be e.g. used to compensate for small angular offsets which can be present among Bragg diffraction-based volume gratings used within a backlight illumination unit. A backlight arrangement is e.g. a two-fold wedge configuration which uses a first volume grating stripe introducing a first, e.g. 10× to 15×, horizontal beam stretching and a second display size volume grating which realized a second, e.g. 10× to 15×, beam stretching along the vertical direction.

Shifting the light spot placed at the engineered diffusers ED-R, ED-G and ED-B which can be done by mirror adjustment changes the mean output angle for each primary colour RGB separately. Piezo translation elements PZT-R, PZT-G and PZT-B provide a lateral movement of the engineered diffusers ED-R, ED-G and ED-B for instance at a frequency above 20 kHz. Thus, a dynamic phase randomization is ensured within each frame impinging the human eye. The light of a single frame which is a single frame displayed by the display device to one eye of an user of a single colour incident on the eye can have a time frame of e.g. 1 ms to 5 ms only. Therefore, the dynamic phase randomization of the light source plane has to be reasonably fast.

A colour beam combining element CBC in form of a colour beam combining prism having two dichroitic coatings is used to generate a white light source which is provided in the front focal plane of the collimating lens COL. Prism types which do not have segmentation within the clear aperture, such as for instance the so-called Philips type colour combining prism arrangement, are preferred. X-cubes are not preferred to be used within holographic displays devices due to the arbitrary phase step which is present between different parts of the clear aperture.

A backlight illumination unit which provides an anamorphic 10× magnification along two directions changes an angular spectrum of plane waves of $\frac{1}{6}°$ deg which is present at the entrance plane of the illumination unit to $\frac{1}{60}°$ deg which will illuminate the SLM.

Using a collimating lens having a focal length f_c enable the use of a round light source having a diameter of $d\_LS = f\_c * \tan(\frac{1}{6}° \text{ deg})$. Thus, f=400 mm allows to use $d\_LS = 1.16$ mm, while realizing an angular spectrum of plane waves of $\frac{1}{60}°$ deg which will illuminate the SLM. Two-dimensional (2D) encoding of sub-holograms in the SLM requires a symmetric shape of the light source.

The maximal lateral dimension of spatial coherence needed to illuminate the SLM is dependent on the maximal positive value of the z position (object point to the SLM) of the reconstructed object points. Thus, to limit the maximal z-value to half of the distance from the display device plane to a user means to limit the maximum "useful" size of the sub-holograms to a size equal or less than the viewing window (VW), which is spanned between the $0^{th}$ and on $1^{st}$ orders of diffraction in a user plane.

The maximum diameter of the entrance pupil of the human eye which has to be taken into account while defining the maximum size of the sub-holograms is $d_{EP}=5$ mm. The entrance pupil of the human eye depends on the luminance and the size of the sub-holograms $d_{EP}=5$ mm are only obtained if the luminance is in the range of a few cd/m² only, as e.g. 10 cd/m².

Within the SLM plane the area of spatially coherence is defined by the maximum of the size of the sub-holograms encoded in the SLM. This size depends on the maximum distance $z_{max}$ of the reconstructed object points. For maximum distance of $z_{max}=\frac{1}{2}$ times of the distance to the user the maximum size of the sub-holograms $d_{sub-hologram-max}$ is the same as the size of the viewing window provided in the user plane and thus e.g. 10 mm.

The size of a human pupil $\varnothing_{EP}$ depends on the luminance of the reconstructed scene. Typical values of the human pupil are $\varnothing_{EP}=2.5$ mm for a luminance of 300 cd/m² and $\varnothing_{EP}=3.5$ mm for a luminance of 30 cd/m². Thus, a maximum size of a sub-hologram of $d_{sub-hologram-max}=5$ mm is quite sufficient to reconstruct object points which are below the resolution limit of the human eye. Therefore, the area of spatial coherence can be chosen to 5 mm.

As mentioned above, a sub-hologram of 5 mm is sufficient. However, three-dimensional (3D) scenes presented with a luminance of larger than 30 cd/m² which has the largest most probability for a standard used of a holographic display device cause a pupil of $\varnothing_{EP}=3.5$ mm and thus can work with an area of spatial coherence of $\varnothing_c=3.5$ mm only. Therefore, for $z_{max}=\frac{1}{2}$ times of the distance from the display device plane to the user an area of spatial coherence of $\varnothing_c=5$ mm is more than enough.

In detail, the computational costs are increased by increasing the size of the sub-holograms, which have to be superimposed. This functional relation is stronger than a linear one. This means instead of using of (a two-dimensional) sub-hologram size of 10 mm×10 mm=100 mm², using a size of 5 mm×5 mm=25 mm² will result in a reduction of the computational costs, which is significant larger than four. Using sub-holograms in a round form further reduces the size occupied within the SLM plane and thus further reduces the computational load.

Two-dimensional (2D) encoded display devices simply can use a beam expander which provides the light source size required in front of the collimating lens COL.

Experimental Simulation:

The exit plane of a multi-mode fibre with a core diameter of $d_{core}=400$ μm and a numerical aperture of NA=0.22 was imaged onto the front focal plane of a collimating achromatic lens with $f_{coll}=400$ mm and $\varnothing_{coll}=50$ mm by using a 1:3.3 imaging mounted pair of two achromatic lenses (f1=30 mm, f2=100 mm). Thus, the size of the light source to be collimated was 1.33 mm. A test resulted in rather 1.6 mm than 1.33 mm. The numerical aperture NA of the light source plane was reduced to $NA_{LS}=0.066$ which is slightly above the numerical aperture NA of the collimating lens which is $NA_{coll}=0.624$.

An angular spectrum of plane waves of $\frac{1}{6}°$ deg, which is $\pm\frac{1}{12}°$ deg, is equivalent to a size of the light source to be collimated of =1.16 mm. The size practical realized was slightly too large. Therefore, an aperture stop with a diameter of 0.9 mm was installed. The collimated wave field was used to illuminate a 14 inch wedge-type backlight illumination unit which realizes two times 10× anamorphic beam magnification by using Bragg diffraction-based volume gratings. The magnification of the beam diameter causes a demagnification of the angular spectrum of plane waves. Thus, the angular spectrum of plane waves in front of the backlight illumination unit which is $\pm\frac{1}{12}°$ deg is transformed to an angular spectrum of plane waves of $\pm\frac{1}{120}°$ deg which was used to illuminate a 14 inch two panel phase+amplitude-SLM. A good reconstruction was obtained.

However, the reconstruction was tested with a light source size of 0.9 mm (aperture stop to be used) and by using an optimized synchronization of the pulsed laser illumination. In addition, a loud speaker used to realize the fibre shaking-type dynamically randomized phase modulation of the light source was replaced by a voice coil arrangement. For initial test a frequency of 50 Hz and square pulsed modulation was used for the fibre shaking.

The following description refers to a one-dimensional (1D) encoding of sub-holograms in a spatial light modulator device SLM.

To use one-dimensional (1D) encoding of sub-holograms in an SLM means to change the design roles of an illumination unit used along the direction along which the so-called sweet spot is formed later on. The sweet spot which is present in a plane of an eye of a user cannot exceed the size of the coherently formed viewing window present along the orthogonal direction.

For instance ±5 mm lateral deviation, e.g. of a beam, at 1 m viewing distance is equivalent to ±0.3° deg angular deviation, e.g. of a beam, and ±5 mm at 3 m viewing distance is equivalent to ±0.1° deg. This is the angular range which has to be spanned by the sweet spot. Thus, the non-symmetric size of a light source used is 18:1 for 1 m viewing distance and 6:1 for 3 m viewing distance.

One possibility for maintaining the numerical aperture of the light source while providing a line-like shape is to use an optical fibre arrangement as light source which has e.g. a round or even a laser diode adapted elliptic shape within the entrance plane and line-like segments at the exit plane.

An Example Experimentally Tested:

A round to linear 7-core multi-mode fibre was used as light source arrangement, which has a core diameter of $d_{core}$=200 µm and a numerical aperture of NA=0.22. Due to a 30 µm thick cladding layer, which results in a fibre diameter of 260 µm a light source line segment, which is an arrangement of several optical fibres along a line segment, with a size of 0.2 mm×1.58 mm is provided for a one-dimensional (1D) encoded colour phase+amplitude-SLM illuminated by using an off-axis parabolic mirror having a focal length of $f_{coll\_OAPM}$=1 m and a diameter of $\emptyset_{OAPM}$=200 mm. The off-axis parabolic mirror has a numerical aperture of 0.1 which means that the numerical aperture of the round to linear fibre bundle is too large, and thus will cause a significant loss of energy. Therefore, a magnification of the exit plane of the optical fibre is required. A magnification of M=2 will reduce the numerical aperture of the light source down to 0.11 and stretch the size to 0.4 mm×3.16 mm. Within this configuration using $f_{coll\_OAPM}$=1 m which do not use a further beam stretching an angular spectrum of plane waves of ⅟60° deg is equivalent to a light source extension of 0.29 mm. This means that a slit-like aperture stop is required which do not exceed 0.29 mm along the spatially coherent direction. Using a magnification of M=2 provides a light source size along the sweet sport direction which is 3.16 mm and thus still slightly too small. However, custom fibre bundle arrangements are already available. Thus, the sweet spot direction can easily be stretched to e.g. a size of 8 mm. This also means that e.g. a 23 fibre containing round-to-linear bundle with a 150 µm core diameter and a 30 µm cladding layer can be used with a magnification of M=2 in order to generate a light source size of 4.11 mm×0.3 mm at a numerical aperture of 0.11 which is only slightly larger than the one of a collimation unit used.

Round-to-linear bundle can be customized to provide line-like shaped light source which has an aspect ratio of e.g. 6:1 to 18:1 or even up to 25:1, while providing approximately the same numerical aperture along two directions. Just to use cylindrical standard optical arrangements or anamorphic prism pairs can provide line-like beam shape but will increase the numerical aperture along the coherent direction, which will cause avoidable loss of optical power.

Using a multi-mode round-to-linear fibre bundle is advantageous. If a so-called 4f-setup is used to image the exit plane of the line-like fibre array onto the front focal plane of a collimating unit then polarization recycling can be provided between two lenses of the 2f-setup which is rather a 2f1+2f2 setup if the magnification M is ≠1.

Polarization recycling can be realized by using a so-called polarizing beam splitter array which is used in projectors already. The polarizing beam splitter is formed as a polarizing beam splitter one-dimensional (1D) segmented array which can be placed between a telescope-like arrangement of two parallel orientated cylinder lens arrays having the same pitch as the polarizing beam splitter stripes. The setup is ordered as follows: line like fibre end |f1| achromatic lens 1| cylinder lens array 1| striped polarizing beam splitter array | cylinder lens array 2| achromatic lens 2|f2| light source plane to be collimated by a collimation unit.

Alternatively to a polarizing beam splitter striped polarization recycler, a birefringent plate can be provided in the centre of a telescope-like arrangement formed by two identical cylinder lens arrays. A first cylinder lens array generates a striped illumination pattern at the entrance plane of the birefringent plate. The exit plane of the birefringent plate comprises striped achromatic retarders which provide a π/2 retardation. The pitch of the striped so-called π/2 or λ/4 retarders is the same as the one of the cylinder lens array. Thus, at the exit plane of the birefringent plate a single polarization state and a reasonably homogeneous intensity distribution can be obtained.

The polarization recycling arrangement can be shifted to one of the two achromatic lenses used to image the exit plane of the line fibre array onto the front focal plane of the collimation unit. Thus, details or non-homogenous intensity distributions are not imaged onto the SLM plane later on.

An arrangement of reduced complexity as the one described above uses an engineered one-dimensional (1D) scatter element which is provided at the front focal plane of a collimating lens. This engineered scatter elements formed as an engineered diffuser generates a line-like flat top light distribution at the position the collimating lens is provided. The scattering angle of the one-dimensional (1D) line generating engineered diffuser and the focal length of the collimating lens are chosen in a way to provide e.g. a 18:1 beam shape. A dynamic phase scatter element is used in the plane of the light source to be collimated by a lens, referred to as collimating lens. The collimating lens has to be illuminated in order to provide a homogeneous intensity distribution. Thus, the scatter element has to provide an adapted or tailored scatter distribution, which means defined scattering angles along defined directions.

For example, an initial beam diameter of 1 mm can be provided. When using a collimating lens having a focal length of $f_{BS}$=25 mm, then the one-dimensional (1D) line generating engineered diffuser has to work at a scattering angle of ±19.8° deg and provides a homogeneous light intensity distribution, which is a 18 mm wide line here at a distance of 25 mm. For a two-dimensional (2D) encoding the angular scatter function used within the plane of the extended light source to be collimated can be close to a symmetric scatter function, but for a one-dimensional (1D) encoding it is not.

Behind the used collimating lens, seen in the propagation of light, a line with a size of 18 mm×1 mm is generated which is formed by collimated light. Consequently, a second engineered diffuser which provides the dynamic statistical randomized phase distribution of the extended light source is placed behind this collimating lens. If the line which is generated behind the collimating lens and which illuminates the dynamic phase randomization plane of the light source to be collimated is not homogeneous enough, then the first engineered one-dimensional (1D) line generating diffuser also has to be moved in a reasonably fast way which easily can be done by mounting the engineered one-dimensional (1D) diffuser onto a piezo element (PZT) which e.g. works at >20 kHz. This can be done for each of the primary light sources in order to optimize the illumination for each primary colour RGB separately.

A practical solution is to arrange three line generating light sources in front of three RGB related entrance planes of a colour combining prism which is provided in front of an achromatic lens realizing the collimation as can be seen in FIG. 14. Polarization recycling is not required within this arrangement.

Hence, homogeneous and cost efficient arrangements can be used in order to provide the tailored angular spectrum of plane waves which is used to illuminate the SLM.

The following describes how a high fill factor of the spatial light modulator device SLM can be achieved.

The fill factor can be increased e.g. by adding beam shaping functionality to the different planes of the SLM. A direct way is to use spherical or aspherical lens or mirror structuring in front of the SLM panel, within the SLM panel or at the exit plane of the SLM panel which e.g. also includes the mm range of ≤3 mm behind the SLM panel.

An exemplary embodiment is to use a micro lens array or an array of cylindrical lenses, which have the pitch of the complex-valued pixel formed by the combination of the phase modulating pixel and the amplitude modulating pixel, in front of the SLM. The fill factor FF of the entrance plane of the SLM can be e.g. FF=0.5. Light reflected back or absorbed without using a lens array will be transmitted to the apertures of the entrance plane of the SLM. Thus, at this point the loss of energy is halved whereby the energy transfer is increased. To focus the light increases its divergence, that is the divergence present behind the focal plane, which is in this case the entrance plane of the SLM. An increased divergence will increase the crosstalk which is present within the complex-valued SLM. Thus, a polarization application which can reduce the crosstalk is advantageous. The reflection plane or the mirror plane which e.g. comprises an in general complex-valued or an amplitude-type apodization profile can also be provided with a spherical lens function or with an aspherical phase functionality in order to increase the energy transfer. However, this could add too much complexity in regard to manufacturability, yield and costs.

A further way is to use additionally to the micro lens array described above a second micro lens array behind the exit plane of the complex-valued SLM. Thus, the energy transfer is increased and the fill factor is increased, too. A higher fill factor will provide less energy in the higher far field diffraction orders of the SLM pattern than a lower fill factor which will result in an increase of the light intensity present outside a viewing window which is e.g. the area between the $0^{th}$, the $+1^{st}\_y$ and the $+1^{st}\_x$ diffraction order. An increase of the energy transfer and an increase of the effective fill factor are related to each other.

The following description refers to a far field calibration.

A far field calibration process can advantageously be used for a holographic three-dimensional (3D) display device. The far field calibration is an application which takes the discrete functionality of all components within the display device into account which are passed by the light from its way from a primary light source to an entrance plane of an eye of a user. This means to measure and to calibrate the amplitude values and the phase values of the light which arrives at the viewing window or at the place where an eye of a user is.

As a result it can be obtained the phase distribution and the amplitude distribution within the viewing window which is provided by each single pixel of the SLM. In general, it is not necessary to calibrate the complex-valued field distribution present within the plane of the entrance pupil of the user and generated by each individual pixel. To choose representative sampling points which can be e.g. ≤1% of the entire pixel count is advantageous due to the fact that most of the characteristics within the display device exhibit slightly varying distributions only.

Alternatively to the far field based calibration a near field calibration can be used, too. It is also possible to image the exit plane of the complex-valued SLM onto a detector plane in order to process the calibration. The results obtained can be directly used or used as calibration data which numerically propagate onto the plane of the viewing window.

Not only the phase distribution and the amplitude distribution are of interest. It can also be measured the values of $\Delta x$, $\Delta y$, where $\Delta x$ is the lateral displacement of the nominal pixel grid along the x direction and $\Delta y$ is the lateral displacement of the nominal pixel grid along the y direction. Lateral deviation in regard to the nominal pixel grid will generate incorrect phase values present in the viewing window.

These values can be recorded in a look-up table (LUT). It shall be introduced slightly individual phase offsets $\Delta\varphi_{ij}$ in dependence on the values recorded in the look-up table. This means that individual lateral offsets of the nominal pixel grid $\Delta x$ and $\Delta y$ of the SLM can be compensated in regard to the influence on the phase values, which have to be generated in the viewing window plane.

Far field calibrations can also take these local lateral offsets into account in order to provide correction data recorded within the look-up table which are used to correct the hologram encoding of the SLM in a way to reduce the difference between theoretical three-dimensional (3D) holographic images and real, aberrated images. Thus, real values can be taken into account instead of pure theoretical values.

Finally, it must be said that the embodiments described above, the embodiments of a complex-valued spatial light modulator device, the embodiments of the illumination unit and the embodiments of the inventive display device shall solely be understood to illustrate the claimed teaching, but that the claimed teaching is not limited to these embodiments. Combinations of embodiments are possible.

The invention claimed is:

1. A display device for holographic reconstruction, comprising
A spatial light modulator device having combined phase modulating pixels and amplitude modulating pixels,
An illumination unit capable of illumination of the spatial light modulator device,
a reflection plane,
arranged for generating sufficiently coherent light, emitted by the illumination unit, entering the spatial light modulator device, the light passing both a phase modulating pixel and an amplitude modulating pixel of the spatial light modulator device, where the light is reflected at an oblique angle by the reflection plane provided between the phase modulating pixels and the amplitude modulating pixels seen in a direction of propagation of light, and where the reflection plane is in a parallel arrangement to the layer having the phase modulation pixels and the amplitude modulating pixels.

2. The display device according to claim 1, wherein the phase modulating pixels and the amplitude modulating pixels of the spatial light modulator device are laterally combined within the same plane.

3. The display device according to claim 1, wherein an oblique illumination of the spatial light modulator device is provided.

4. The display device according to claim 1, wherein the illumination unit is designed as front light illumination unit or backlight illumination unit.

5. The display device according to claim 1, wherein, the light passing both the phase modulating pixels and the amplitude modulating pixels is reflected by a mirror system in between arranged in the reflection plane.

6. The display device according to claim 5, wherein the mirror system comprises mirror segments.

7. The display device according to claim 5, wherein the spatial light modulator device comprises at least one transparent substrate, the transparent substrate has on one side an addressable transmissive layer having the phase modulating pixels and the amplitude modulating pixels and on the other opposite side a plane which is the reflection plane, where in the reflection plane the mirror system is arranged.

8. The display device according to claim 6, wherein the mirror segments of the mirror system are arranged opposite to the phase modulating pixels and the amplitude modulating pixels in such a way that each mirror segment covers both a part of the phase modulating pixel and a part of the amplitude modulating pixel.

9. The display device according to claim 1, further comprising a polarization selective element, where the polarization selective element is provided at a light exit plane of the spatial light modulator device, seen in the propagation of the light.

10. The display device according to claim 9, wherein the polarization selective element is formed as polarization analyzer or wire grid polarizer.

11. The display device according to claim 1, wherein the phase modulating pixels comprise reflection means, where the reflection means are provided at back ends of the phase modulating pixels, seen in propagation of light.

12. The display device according to claim 1, wherein a polarization filter is provided in the plane of the phase modulating pixels and the amplitude modulating pixels, where the polarization filter comprises polarization filter segments.

13. The display device according to claim 12, wherein the polarization filter segments are assigned to the phase modulating pixels and the amplitude modulating pixels, where a polarization orientation of adjacent polarization filter segments is orthogonal.

14. The display device according to claim 12, wherein the polarization filter segments are absorptive-type polarization filter segments which are provided at light exit apertures of the amplitude modulating pixels, or the polarization filter segments are reflective-type polarization filter segments which are provided at reflecting back ends of the phase modulating pixels, seen in the propagation of light.

15. The display device according to claim 1, wherein at least one of an apodization filter, and a retardation element, is provided.

16. The display device according to claim 15, wherein the apodization filter is a micro lens-like structure applied onto the mirror system in the reflection plane or the apodization filter is an absorptive alloy composition layer.

17. The display device according to claim 1, wherein at least one lens array is provided, where the lens array is provided in front of the spatial light modulator device, seen in the propagation of light, where the light emitted by the illumination unit is bundled and enters entrance apertures of the spatial light modulator device.

18. The display device according to claim 1, wherein in entrance apertures of the spatial light modulator device lens structures are provided to focus the light.

19. The display device according to claim 1, wherein the spatial light modulator device comprises a beam displacing element, where at least one transparent substrate of the spatial light modulator device is designed as the beam displacing element for shifting incident light passed the phase modulating pixel or the amplitude modulating pixel.

20. The display device according to claim 1, wherein the spatial light modulator device is illuminated along different, individual controllable directions.

21. The display device according to claim 1, wherein the spatial light modulator device comprises a backplane which comprises clusters having buried electrodes and additional transistors along with transistors for controlling the pixels, where the electrodes and the additional transistors are arranged behind the reflection means of the phase modulating pixels of the spatial light modulator device, seen in propagation of light.

22. The display device according to claim 1, wherein a light emitting device is provided behind the pixels of the spatial light modulator device seen in the propagation of light to generate a two-dimensional functionality of the display device.

23. The display device according to claim 22, wherein the light emitting device is composed of clusters having light emitting zones, where a cluster covers a specific number of pixels of the spatial light modulator device.

24. The display device according to claim 1, wherein the spatial light modulator device is a liquid crystal-based spatial light modulator device, a micro electro mechanical system-based spatial light modulator device or a multiple quantum well-based spatial light modulator device.

25. The display device according to claim 1, wherein the illumination unit comprises at least one volume grating for decoupling the light out of the illumination unit towards the spatial light modulator device.

26. The display device according to claim 1, wherein the illumination unit comprises at least one controlled phase randomizing element to generate a homogeneous intensity distribution of light incident on a subsequent collimating element.

27. The display device according to claim 1, further comprising a field lens, where the field lens is in particular a combined field lens comprising at least one volume grating.

28. The display device according to claim 1, further comprising a vertical tracking unit and/or a horizontal tracking unit, where the vertical tracking unit and/or the horizontal tracking unit comprise at least one liquid crystal grating.

29. The display device according to claim 1, wherein the display device is for generating at least one of a two-dimensional and/or three-dimensional representation of a scene or of content, and the spatial light modulator device comprises phase modulating pixels and amplitude modulating pixels.

30. The display device according to claim 29, wherein the spatial light modulator device comprises at least one transparent substrate, an addressable transmissive layer comprising the phase modulating pixels and the amplitude modulating pixels and a reflection plane.

31. A method of generating a holographic reconstruction by using a display device according to claim 1, comprising
  illuminating of phase modulating pixels and amplitude modulating pixels of the spatial light modulator device by the illumination unit with the sufficiently coherent light,
  passing of light of both the phase modulating pixels and amplitude modulating pixels of the spatial light modulator device, and
  reflecting the light by the reflection plane in between, where the reflection plane is provided in light propagation between both the phase modulating pixels and the amplitude modulating pixels.

32. The method according to claim 31, wherein the light pass through the phase modulating pixels two times.

33. The display device according to claim 15, wherein the apodization filter is designed as a patterned apodization profile layer; the retardation element is designed as an achromatic or apochromatic retarder layer.

34. The display device according to claim 19, wherein the beam displacing element is designed as a birefringent element.

* * * * *